(12) United States Patent  
Kang et al.

(10) Patent No.: US 12,055,342 B2  
(45) Date of Patent: *Aug. 6, 2024

(54) VACUUM ADIABATIC BODY AND REFRIGERATOR

(71) Applicant: LG ELECTRONICS INC., Seoul (KR)

(72) Inventors: Myoungju Kang, Seoul (KR); Deokhyun Youn, Seoul (KR); Jangseok Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/143,378

(22) Filed: May 4, 2023

(65) Prior Publication Data

US 2023/0304727 A1  Sep. 28, 2023

Related U.S. Application Data

(63) Continuation of application No. 16/980,599, filed as application No. PCT/KR2019/007757 on Jun. 26, 2019, now Pat. No. 11,692,764.

(30) Foreign Application Priority Data

Jun. 27, 2018 (KR) .......... 10-2018-0074232

(51) Int. Cl.
*F25D 23/02* (2006.01)
*F16L 59/065* (2006.01)
(Continued)

(52) U.S. Cl.
CPC .......... *F25D 23/066* (2013.01); *F16L 59/065* (2013.01); *F25D 11/02* (2013.01);
(Continued)

(58) Field of Classification Search
CPC ........ F25D 11/02; F25D 17/062; F25D 17/08; F25D 2201/1282; F25D 2201/14;
(Continued)

(56) References Cited

U.S. PATENT DOCUMENTS 4,349,051 A * 9/1982 Schilf ...................... F16L 59/04  
220/592.27  
4,486,368 A 12/1984 Hancock  
(Continued)

FOREIGN PATENT DOCUMENTS

CN     1166592    12/1997  
CN   102829593    12/2012  
(Continued)

OTHER PUBLICATIONS

International Search Report dated Oct. 15, 2019 issued in Application No. PCT/KR2019/007757.
(Continued)

*Primary Examiner* — Filip Zec  
(74) *Attorney, Agent, or Firm* — KED & ASSOCIATES, LLP

(57) ABSTRACT

Provided is a vacuum adiabatic body. To reduce a heat transfer amount between two plates, the vacuum adiabatic body includes: a conductive resistance sheet connecting plate members to each other, an exhaust port through which a gas of a third space is exhausted, and a sealing frame covering a conductive resistance sheet. A virtual line connecting both end portions of the conductive resistance sheet to each other is installed to be obliquely inclined when at least one extension direction of a first plate member or a second plate member is viewed in a horizontal direction.

20 Claims, 26 Drawing Sheets

(51) Int. Cl.
*F25D 11/02* (2006.01)
*F25D 17/06* (2006.01)
*F25D 17/08* (2006.01)
*F25D 23/06* (2006.01)

(52) U.S. Cl.
CPC .......... *F25D 17/062* (2013.01); *F25D 17/08* (2013.01); *F25D 23/02* (2013.01); *F25D 23/069* (2013.01); *F25D 2201/1282* (2013.01); *F25D 2317/043* (2013.01); *F25D 2600/04* (2013.01)

(58) Field of Classification Search
CPC ...... F25D 23/02; F25D 23/062; F25D 23/066; F25D 23/069; F25D 23/087; F25D 2317/043; F25D 2600/04; F16L 59/065
See application file for complete search history.

(56) References Cited

U.S. PATENT DOCUMENTS

| | | | |
|---|---|---|---|
| 5,916,076 A | | 6/1999 | Cittadini et al. |
| 6,158,233 A | * | 12/2000 | Cohen ................ F25D 21/04 220/641 |
| 8,381,382 B2 | | 2/2013 | Wunnicke |
| 8,869,493 B2 | | 10/2014 | Chubb |
| 9,103,569 B2 | * | 8/2015 | Cur ................ F25D 11/022 |
| 9,400,133 B2 | * | 7/2016 | Miyaji ............... F25D 23/065 |
| 9,490,333 B2 | | 11/2016 | Park |
| 9,970,698 B2 | * | 5/2018 | Gomes ............... F25D 11/022 |
| 10,493,725 B2 | * | 12/2019 | Shinoki ................ B32B 15/20 |
| 11,021,905 B1 | * | 6/2021 | Ekshinge ............ E06B 3/2632 |
| 2004/0051427 A1 | | 3/2004 | Cittadini et al. |
| 2004/0100168 A1 | | 5/2004 | Choi |
| 2004/0226956 A1 | | 11/2004 | Brooks |
| 2006/0260229 A1 | | 11/2006 | McKinlay et al. |
| 2013/0306267 A1 | | 11/2013 | Feldman |
| 2015/0030800 A1 | | 1/2015 | Jung et al. |
| 2016/0185068 A1 | | 6/2016 | Shinohara |
| 2018/0216873 A1 | | 8/2018 | Jung et al. |
| 2018/0224195 A1 | | 8/2018 | Jung et al. |
| 2018/0238610 A1 | | 8/2018 | Jung et al. |

FOREIGN PATENT DOCUMENTS

| | | |
|---|---|---|
| CN | 104254749 | 12/2014 |
| CN | 107850377 | 3/2018 |
| EA | 008294 | 4/2007 |
| EP | 0 658 733 | 5/1998 |
| EP | 2829827 | 1/2015 |
| JP | 2005-201520 | 7/2005 |
| JP | 2008-089244 | 4/2008 |
| JP | 2013-002655 | 1/2013 |
| KR | 10-0343719 | 7/2002 |
| KR | 10-2012-0011514 | 2/2012 |
| KR | 10-2015-0012712 | 2/2015 |
| KR | 10-2017-0016187 | 2/2017 |
| KR | 10-2019-0070765 | 6/2019 |
| RU | 7480 | 8/1998 |
| RU | 2246077 | 2/2005 |
| RU | 2285207 | 10/2006 |
| SU | 1174697 | 8/1985 |
| WO | WO 2017/023095 | 2/2017 |
| WO | WO 2017/023100 | 2/2017 |

OTHER PUBLICATIONS

Written Opinion dated Oct. 15, 2019 issued in Application No. PCT/KR2019/007757.
Russian Office Action dated Jun. 2, 2021 issued in Application No. 2020132154/10(058398) English translation attached.
Chinese Office Action dated Aug. 4, 2021 issued in Application No. 201980024384.1.
Russian Office Action dated Oct. 13, 2021 issued in RU Application No. 2020132154.
European Search Report dated Feb. 17, 2022 issued in EP Application No. 19827020.9.

* cited by examiner (a)

(b)

(c)

VACUUM ADIABATIC BODY AND REFRIGERATOR

CROSS-REFERENCE TO RELATED APPLICATIONS

This application is a Continuation Application of prior U.S. patent application Ser. No. 16/980,599 filed Sep. 14, 2020, which is a U.S. National Stage Application under 35 U.S.C. § 371 of PCT Application No. PCT/KR2019/007757, filed Jun. 26, 2019, which claims priority to Korean Patent Application No. 10-2018-0074232, filed Jun. 27, 2018, whose entire disclosures are hereby incorporated by reference.

BACKGROUND

1. Field

The present disclosure relates to a vacuum adiabatic body and a refrigerator.

2. Background

A vacuum adiabatic body is a product for suppressing heat transfer by vacuumizing the interior of a body thereof. The vacuum adiabatic body may reduce heat transfer by convection and conduction, and hence is applied to heating apparatuses and refrigerating apparatuses. In a typical adiabatic method applied to a refrigerator, although it is differently applied in refrigeration and freezing, a foam urethane adiabatic wall having a thickness of about 30 mm or more is generally provided. However, the internal volume of the refrigerator is therefore reduced.

In order to increase the internal volume of a refrigerator, there is an attempt to apply a vacuum adiabatic body to the refrigerator.

First, Korean Patent No. 10-0343719 (Cited Document 1) of the present applicant has been disclosed. According to Reference Document 1, there is disclosed a method in which a vacuum adiabatic panel is prepared and then built in walls of a refrigerator, and the exterior of the vacuum adiabatic panel is finished with a separate molding as Styrofoam. According to the method, additional foaming is not required, and the adiabatic performance of the refrigerator is improved. However, fabrication cost is increased, and a fabrication method is complicated.

As another example, a technique of providing walls using a vacuum adiabatic material and additionally providing adiabatic walls using a foam filling material has been disclosed in Korean Patent Publication No. 10-2015-0012712 (Cited Document 2). According to Reference Document 2, fabrication cost is increased, and a fabrication method is complicated.

As further another example, there is an attempt to fabricate all walls of a refrigerator using a vacuum adiabatic body that is a single product. For example, a technique of providing an adiabatic structure of a refrigerator to be in a vacuum state has been disclosed in U.S. Patent Laid-Open Publication No. US20040226956A1 (Reference Document 3). However, it is difficult to obtain a practical level of an adiabatic effect by providing a wall of the refrigerator with sufficient vacuum. In detail, there are limitations that it is difficult to prevent a heat transfer phenomenon at a contact portion between an outer case and an inner case having different temperatures, it is difficult to maintain a stable vacuum state, and it is difficult to prevent deformation of a case due to a negative pressure of the vacuum state. Due to these limitations, the technology disclosed in Reference Document 3 is limited to a cryogenic refrigerator, and does not provide a level of technology applicable to general households.

Alternatively, the present applicant has applied for Korean Patent Publication No. 10-2017-0016187 (Cited Document 4) that discloses a vacuum adiabatic body and a refrigerator. According to the present disclosure, both the door and the main body of the refrigerator are provided as a vacuum adiabatic body, and a large adiabatic material is added to the edge of the door to prevent cold air from leaking from the edge of the main body and the door. However, there is a limitation in that manufacturing is complicated, and an internal volume of the refrigerator is greatly reduced. Also, since the internal space of the vacuum adiabatic body is empty in a vacuum state, there is a limitation that deformation such as bending or buckling occurs due to weak strength when compared to an article filled with a resin material such as polyurethane according to the related art.

To solve the above-mentioned limitations, the applicant of the present disclosure has applied for Korean Patent Application No. 10-2017-0171616 (Cited Document 5). According to this technology, a separate sealing frame is added to increase the internal space of the vacuum adiabatic body and enhance the adiabatic performance between the body and the door.

According to Cited Document 5, the internal volume of the refrigerator increases, but a contact area between a gasket and the sealing frame is still narrow, and thus, sufficient adiabatic performance may not be achieved. Also, there is a limitation in that it is difficult to form an energy nose as an adiabatic gap part due to an air layer, not only sealing by contact of the gasket, resulting in deterioration of adiabatic efficiency.

The above references are incorporated by reference herein where appropriate for appropriate teachings of additional or alternative details, features and/or technical background.

DISCLOSURE

Technical Problem

Embodiments provide a refrigerator to which a vacuum adiabatic body having a narrow adiabatic interval is applied and in which an adiabatic interval due to contact between a door and a main body more increases.

Embodiments also provide a refrigerator to which a vacuum adiabatic body having a narrow adiabatic interval is applied and in which an energy nose realized in an air layer having a narrow width in a contact interval between a door and a main body is sufficiently secured.

Embodiment s also provide in which a refrigerator to which a vacuum adiabatic body is applied and in which heat loss due to thermal conduction passing through a conductive resistance sheet is reduced.

Technical Solution

In one embodiment, a vacuum adiabatic body includes: a conductive resistance sheet provided on a contact surface of a pair of plate members constituting a wall of the vacuum adiabatic body to block thermal conduction between the plate members; and a sealing frame configured to cover the conductive resistance sheet, wherein a virtual line connecting both end portions of the conductive resistance sheet to each other is installed to be obliquely inclined when at least one extension direction of a first plate member or a second plate member is viewed in a horizontal direction. According to an embodiment, conductive heat transfer may be more reduced to improve adiabatic efficiency of a refrigerator.

In another embodiment, a refrigerator includes: a gasket installed on the door or the main body to seal a portion at which the door and the main body contact each other; and a sealing frame contacting the gasket as a member corresponding to the gasket, the sealing frame being disposed between the third space and the door, wherein the gasket includes: a gasket body contacting the sealing frame to seal a gap between the door and the main body; and a gasket coupling tool disposed to be obliquely inclined with respect to an extension direction of the gasket body. According to an embodiment, an adiabatic interval may significantly increase to improve adiabatic efficiency.

A heat resistance unit that resists heat transfer between plate members may include a conductive resistance sheet that resists conduction of heat transferred along a wall of the vacuum space part and may further include a side frame coupled to the conductive resistance sheet.

Also, the heat resistance unit may include at least one radiation resistance sheet that is provided in a plate shape within the vacuum space part or may include a porous material that resists radiation heat transfer between the second plate member and the first plate member within the vacuum space part.

Advantageous Effects

According to the embodiments, since the contact part between the door and the main body is provided to be inclined, the adiabatic interval due to the contact may more increase, and the thermal conduction passing through the contact portion may be greatly reduced.

According to the embodiments, after the contact part between the door and the main body, the energy nose may be secured to be sufficiently long, and the adiabatic effect may more increase.

According to the embodiments, the length of the conductive resistance sheet provided at the same interval becomes longer so that the conductive heat loss of the vacuum adiabatic body may be reduced, and the energy consumption efficiency of the refrigerator may be further improved.

BRIEF DESCRIPTION OF THE DRAWINGS

FIGS. 13 and 14 are partial cutaway perspective views of an inner surface part, wherein FIG. 13 illustrates in a state in which coupling is completed, and FIG. 14 illustrates a coupling process.

FIGS. 16 and 17 are views illustrating one end portion of the sealing frame, wherein FIG. 16 illustrates a state before a door hinge is installed, and FIG. 17 illustrates a state in which the door hinge is installed.

FIG. 18 is a view for explaining an effect of the sealing frame according to an embodiment in comparison with the technique according to the related art, wherein FIG. 18(a) is a cross-sectional view of a contact part of a main body-side vacuum adiabatic body and a door according to an embodiment, and FIG. 18(b) is a cross-sectional view of a main body and a door according to the related art.

DETAILED DESCRIPTION

Hereinafter, exemplary embodiments will be described with reference to the accompanying drawings. The invention may, however, be embodied in many different forms and should not be construed as being limited to the embodiments set forth herein, and a person of ordinary skill in the art, who understands the spirit of the present invention, may readily implement other embodiments included within the scope of the same concept by adding, changing, deleting, and adding components; rather, it will be understood that they are also included within the scope of the present invention.

The drawings shown below may be displayed differently from the actual product, or exaggerated or simple or detailed parts may be deleted, but this is intended to facilitate understanding of the technical idea of the present invention. It should not be construed as limited. However, it will try to show the actual shape as much as possible.

The following embodiments may be applied to the description of another embodiment unless the other embodiment does not collide with each other, and some configurations of any one of the embodiments may be modified in a state in which only a specific portion is modified in another configuration may be applied.

In the following description, the vacuum pressure means any pressure state lower than the atmospheric pressure. In addition, the expression that a vacuum degree of A is higher than that of B means that a vacuum pressure of A is lower than that of B.

Figure 1:
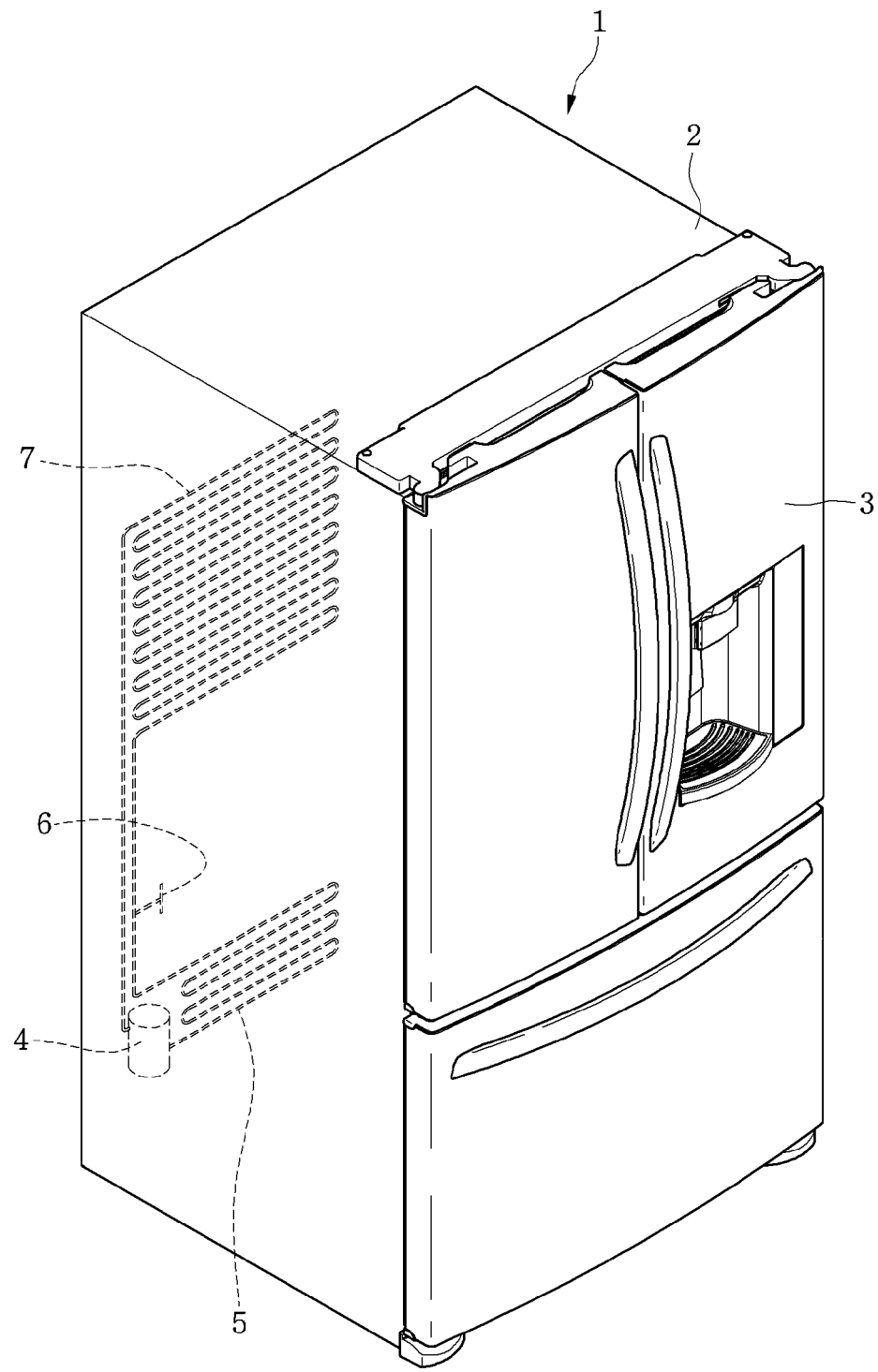
FIG. 1 is a perspective view of a refrigerator according to an embodiment.

FIG. 1 is a perspective view of a refrigerator according to an embodiment.

Referring to FIG. 1, the refrigerator 1 includes a main body 2 provided with a cavity 9 capable of storing storage goods and a door 3 provided to open/close the main body 2. The door 3 may be rotatably or slidably movably disposed to open/close the cavity 9. The cavity 9 may provide at least one of a refrigerating compartment and a freezing compartment.

Parts constituting a freezing cycle in which cold air is supplied into the cavity 9. In detail, the parts include a compressor 4 for compressing a refrigerant, a condenser 5 for condensing the compressed refrigerant, an expander 6 for expanding the condensed refrigerant, and an evaporator 7 for evaporating the expanded refrigerant to take heat. As a typical structure, a fan may be installed at a position adjacent to the evaporator 7, and a fluid blown from the fan may pass through the evaporator 7 and then be blown into the cavity 9. A freezing load is controlled by adjusting the blowing amount and blowing direction by the fan, adjusting the amount of a circulated refrigerant, or adjusting the compression rate of the compressor, so that it is possible to control a refrigerating space or a freezing space.

Figure 2:
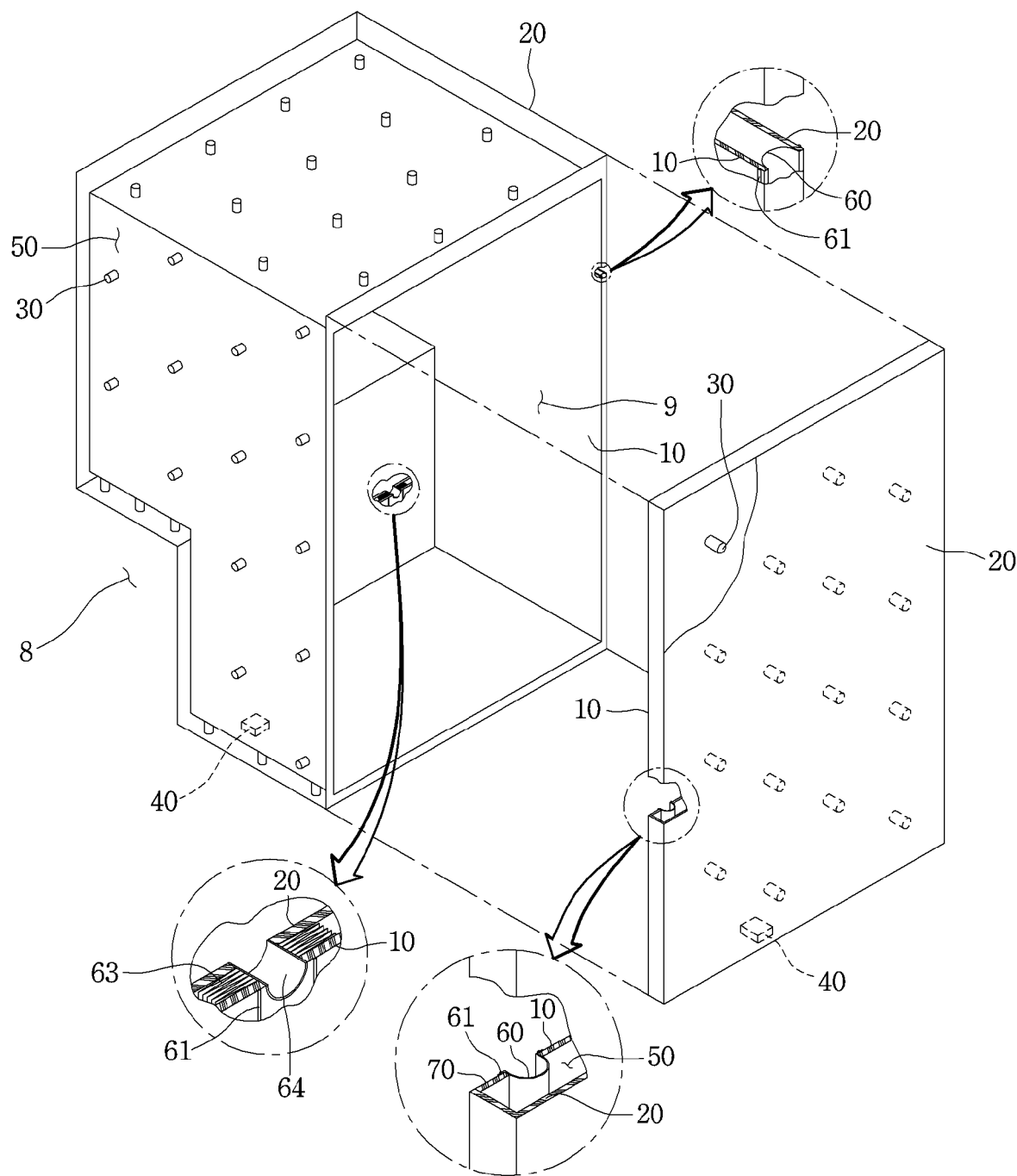
FIG. 2 is a view schematically showing a vacuum adiabatic body used in a main body and a door of the refrigerator.

FIG. 2 is a view schematically showing a vacuum adiabatic body used in the main body and the door of the refrigerator. In FIG. 2, a main body-side vacuum adiabatic body is illustrated in a state in which top and side walls are removed, and a door-side vacuum adiabatic body is illustrated in a state in which a portion of a front wall is removed. In addition, sections of portions at conductive resistance sheets are provided are schematically illustrated for convenience of understanding.

Referring to FIG. 2, the vacuum adiabatic body includes a first plate member 10 for providing a wall of a low-temperature space, a second plate member 20 for providing a wall of a high-temperature space, a vacuum space part 50 defined as an interval part between the first and second plate members 10 and 20. Also, the vacuum adiabatic body includes the conductive resistance sheets 60 and 63 for preventing thermal conduction between the first and second plate members 10 and 20. A sealing part 61 for sealing the first and second plate members 10 and 20 is provided such that the vacuum space part 50 is in a sealing state. When the vacuum adiabatic body is applied to a refrigerating or heating cabinet, the first plate member 10 may be referred to as an inner case, and the second plate member 20 may be referred to as an outer case. A machine room 8 in which parts providing a freezing cycle are accommodated is placed at a lower rear side of the main body-side vacuum adiabatic body, and an exhaust port 40 for forming a vacuum state by exhausting air in the vacuum space part 50 is provided at any one side of the vacuum adiabatic body. In addition, a pipeline 64 passing through the vacuum space part 50 may be further installed so as to install a defrosting water line and electric lines.

The first plate member 10 may define at least one portion of a wall for a first space provided thereto. The second plate member 20 may define at least one portion of a wall for a second space provided thereto. The first space and the second space may be defined as spaces having different temperatures. Here, the wall for each space may serve as not only a wall directly contacting the space but also a wall not contacting the space. For example, the vacuum adiabatic body of the embodiment may also be applied to a product further having a separate wall contacting each space.

Factors of heat transfer, which cause loss of the adiabatic effect of the vacuum adiabatic body, are thermal conduction between the first and second plate members 10 and 20, heat radiation between the first and second plate members 10 and 20, and gas conduction of the vacuum space part 50.

Hereinafter, a heat resistance unit provided to reduce adiabatic loss related to the factors of the heat transfer will be provided. Meanwhile, the vacuum adiabatic body and the refrigerator of the embodiment do not exclude that another adiabatic means is further provided to at least one side of the vacuum adiabatic body. Therefore, an adiabatic means using foaming or the like may be further provided to another side of the vacuum adiabatic body.

The heat resistance unit may include a conductive resistance sheet that resists conduction of heat transferred along a wall of a third space and may further include a side frame coupled to the conductive resistance sheet. The conductive resistance sheet and the side frame will be clarified by the following description.

Also, the heat resistance unit may include at least one radiation resistance sheet that is provided in a plate shape within the third space or may include a porous material that resists radiation heat transfer between the second plate member and the first plate member within the third space. The radiation resistance sheet and the porous material will be clarified by the following description.

Figure 3:
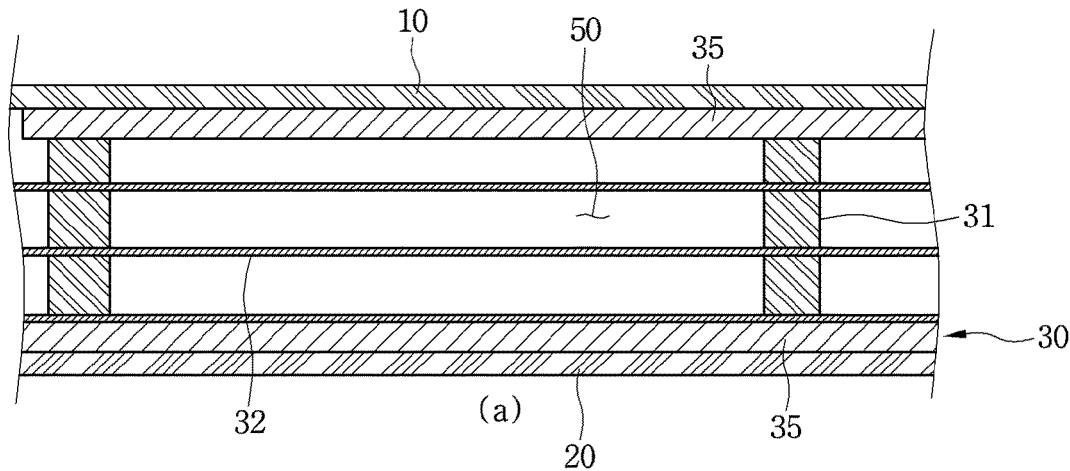
FIG. 3 is a view illustrating various embodiments of an internal configuration of a vacuum space part.
Figure 3:
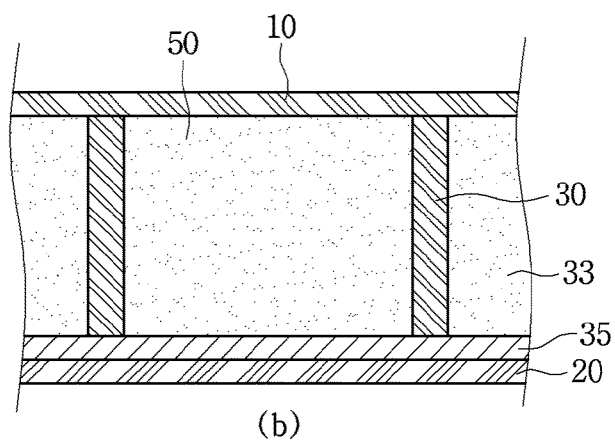
Figure 3:
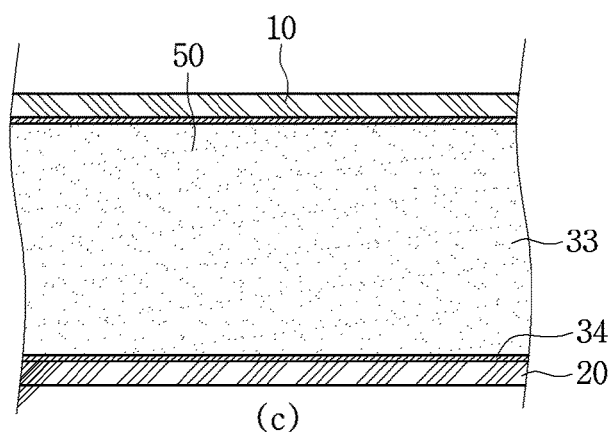

FIG. 3 is a view illustrating various embodiments of an internal configuration of the vacuum space part.

First referring to FIG. 3A, the vacuum space part 50 may be provided in a third space having a pressure different from that of each of the first and second spaces, preferably, a vacuum state, thereby reducing an adiabatic loss. The third space may be provided at a temperature between the temperature of the first space and the temperature of the second space. Since the third space is provided as a space in the vacuum state, the first and second plate members 10 and 20 receive a force contracting in a direction in which they approach each other due to a force corresponding to a pressure difference between the first and second spaces. Therefore, the vacuum space part 50 may be deformed in a direction in which it is reduced. In this case, the adiabatic loss may be caused due to an increase in amount of heat radiation, caused by the contraction of the vacuum space part 50, and an increase in amount of thermal conduction, caused by contact between the plate members 10 and 20.

The supporting unit 30 may be provided to reduce deformation of the vacuum space part 50. The supporting unit 30 includes a bar 31. The bar 31 may extend in a substantially vertical direction with respect to the plate members to support a distance between the first plate member and the second plate member. A support plate 35 may be additionally provided on at least any one end of the bar 31. The support plate 35 may connect at least two or more bars 31 to each other to extend in a horizontal direction with respect to the first and second plate members 10 and 20. The support plate 35 may be provided in a plate shape or may be provided in a lattice shape so that an area of the support plate contacting the first or second plate member 10 or 20 decreases, thereby reducing heat transfer. The bars 31 and the support plate 35 are fixed to each other at at least one portion, to be inserted together between the first and second plate members 10 and 20. The support plate 35 contacts at least one of the first and second plate members 10 and 20, thereby preventing deformation of the first and second plate members 10 and 20. In addition, based on the extension direction of the bars 31, a total sectional area of the support plate 35 is provided to be greater than that of the bars 31, so that heat transferred through the bars 31 may be diffused through the support plate 35.

The supporting unit 30 may be made of a resin selected from PC, glass fiber PC, low outgassing PC, PPS, and LCP to obtain high compressive strength, a low outgassing and water absorption rate, low thermal conductivity, high compressive strength at a high temperature, and superior processability.

A radiation resistance sheet 32 for reducing heat radiation between the first and second plate members 10 and 20 through the vacuum space part 50 will be described. The first and second plate members 10 and 20 may be made of a stainless material capable of preventing corrosion and providing a sufficient strength. The stainless material has a relatively high emissivity of 0.16, and hence a large amount of radiation heat may be transferred. In addition, the supporting unit 30 made of the resin has a lower emissivity than the plate members, and is not entirely provided to inner surfaces of the first and second plate members 10 and 20. Hence, the supporting unit 30 does not have great influence on radiation heat. Therefore, the radiation resistance sheet 32 may be provided in a plate shape over a majority of the area of the vacuum space part 50 so as to concentrate on reduction of radiation heat transferred between the first and second plate members 10 and 20. A product having a low emissivity may be preferably used as the material of the radiation resistance sheet 32. In an embodiment, an aluminum foil having an emissivity of 0.02 may be used as the radiation resistance sheet 32. Also, since the transfer of radiation heat may not be sufficiently blocked using one radiation resistance sheet, at least two radiation resistance sheets 32 may be provided at a certain distance so as not to contact each other. Also, at least one radiation resistance sheet may be provided in a state in which it contacts the inner surface of the first or second plate member 10 or 20.

Referring to FIG. 3B, the distance between the plate members is maintained by the supporting unit 30, and a porous material 33 may be filled in the vacuum space part 50. The porous material 33 may have a higher emissivity than the stainless material of the first and second plate members 10 and 20. However, since the porous material 33 is filled in the vacuum space part 50, the porous material 33 has a high efficiency for resisting the radiation heat transfer.

In the present embodiment, the vacuum adiabatic body may be manufactured without the radiation resistance sheet 32.

Referring to FIG. 3C, the supporting unit 30 for maintaining the vacuum space part 50 may not be provided. A porous material 333 may be provided to be surrounded by a film 34 instead of the supporting unit 30. Here, the porous material 33 may be provided in a state of being compressed so that the interval of the vacuum space part is maintained. The film 34 made of, for example, a PE material may be provided in a state in which a hole is punched in the film 34.

In the present embodiment, the vacuum adiabatic body may be manufactured without the supporting unit 30. That is to say, the porous material 33 may perform the function of the radiation resistance sheet 32 and the function of the supporting unit 30 together.

Figure 4:
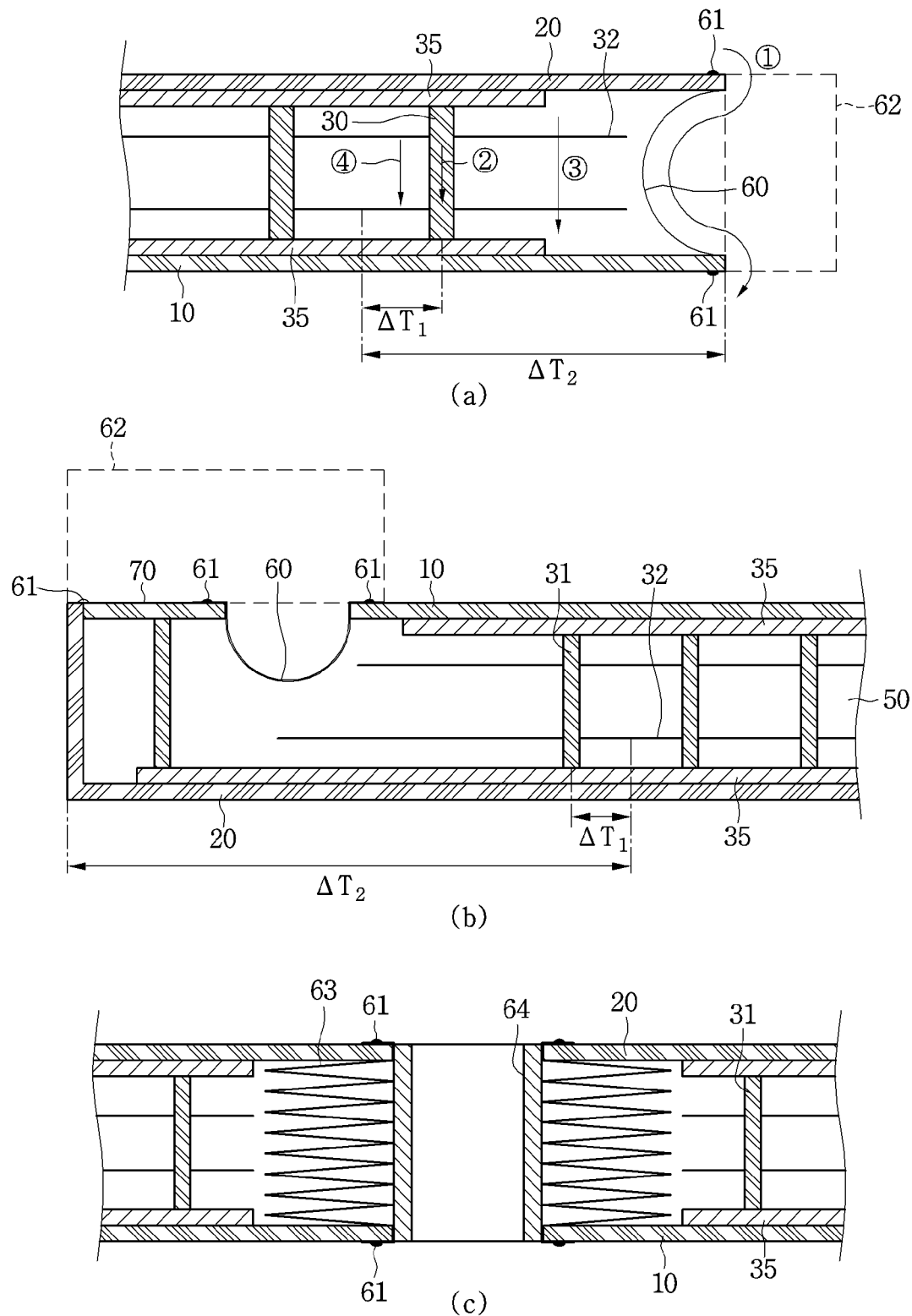
FIG. 4 is a view illustrating various embodiments of conductive resistance sheets and peripheral portions thereof.

FIG. 4 is a view illustrating various embodiments of conductive resistance sheets and peripheral parts thereof. Structures of the conductive resistance sheets are briefly illustrated in FIG. 2, but will be understood in detail with reference to the drawings.

First, a conductive resistance sheet proposed in FIG. 8A may be preferably applied to the main body-side vacuum adiabatic body. Specifically, the first and second plate members 10 and 20 are to be sealed so as to vacuumize the interior of the vacuum adiabatic body. In this case, since the two plate members have different temperatures from each other, heat transfer may occur between the two plate members. A conductive resistance sheet 60 is provided to prevent thermal conduction between two different kinds of plate members.

The conductive resistance sheet 60 may be provided with the sealing part 61 at which both ends of the conductive resistance sheet 60 are sealed to defining at least one portion of the wall for the third space and maintain the vacuum state. The conductive resistance sheet 60 may be provided as a thin foil in unit of micrometer so as to reduce the amount of heat conducted along the wall for the third space. The sealing parts 610 may be provided as welding parts. That is, the conductive resistance sheet 60 and the plate members 10 and 20 may be fused to each other. In order to cause a fusing action between the conductive resistance sheet 60 and the plate members 10 and 20, the conductive resistance sheet 60 and the plate members 10 and 20 may be made of the same material, and a stainless material may be used as the material. The sealing parts 610 are not limited to the welding parts, and may be provided through a process such as cocking. The conductive resistance sheet 60 may be provided in a curved shape. Thus, a thermal conduction distance of the conductive resistance sheet 60 is provided longer than the linear distance of each plate member, so that the amount of thermal conduction may be further reduced.

A change in temperature occurs along the conductive resistance sheet 60. Therefore, in order to block heat transfer to the exterior of the conductive resistance sheet 60, a shielding part 62 may be provided at the exterior of the conductive resistance sheet 60 such that an adiabatic action occurs. In other words, in the refrigerator, the second plate member 20 has a high temperature and the first plate member 10 has a low temperature. In addition, thermal conduction from high temperature to low temperature occurs in the conductive resistance sheet 60, and hence the temperature of the conductive resistance sheet 60 is suddenly changed. Therefore, when the conductive resistance sheet 60 is opened to the exterior thereof, heat transfer through the opened place may seriously occur. In order to reduce heat loss, the shielding part 62 is provided at the exterior of the conductive resistance sheet 60. For example, when the conductive resistance sheet 60 is exposed to any one of the low-temperature space and the high-temperature space, the conductive resistance sheet 60 does not serve as a conductive resistor as well as the exposed portion thereof, which is not preferable.

The shielding part 62 may be provided as a porous material contacting an outer surface of the conductive resistance sheet 60. The shielding part 62 may be provided as an adiabatic structure, e.g., a separate gasket, which is placed at the exterior of the conductive resistance sheet 60. The shielding part 62 may be provided as a portion of the vacuum adiabatic body, which is provided at a position facing a corresponding conductive resistance sheet 60 when the main body-side vacuum adiabatic body is closed with respect to the door-side vacuum adiabatic body. In order to reduce heat loss even when the main body and the door are opened, the shielding part 62 may be preferably provided as a porous material or a separate adiabatic structure.

A conductive resistance sheet proposed in FIG. 4(b) may be preferably applied to the door-side vacuum adiabatic body. In FIG. 4(b), portions different from those of FIG. 4(a) are described in detail, and the same description is applied to portions identical to those of FIG. 4(a). A side frame 70 is further provided at an outside of the conductive resistance sheet 60. A part for sealing between the door and the main body, an exhaust port necessary for an exhaust process, a getter port for vacuum maintenance, and the like may be placed on the side frame 70. This is because the mounting of parts is convenient in the main body-side vacuum adiabatic body, but the mounting positions of parts are limited in the door-side vacuum adiabatic body.

In the door-side vacuum adiabatic body, it is difficult to place the conductive resistance sheet 60 at a front end portion of the vacuum space part, i.e., a corner side portion of the vacuum space part. This is because, unlike the main body, a corner edge portion of the door is exposed to the exterior. In more detail, if the conductive resistance sheet 60 is placed at the front end portion of the vacuum space part, the corner edge portion of the door is exposed to the exterior, and hence there is a disadvantage in that a separate adiabatic part should be configured so as to thermally insulate the conductive resistance sheet 60.

A conductive resistance sheet proposed in FIG. 4(c) may be preferably installed in the pipeline passing through the vacuum space part. In FIG. 4(c), portions different from those of FIGS. 4(a) and 4(b) are described in detail, and the same description is applied to portions identical to those of FIGS. 4(a) and 4(b). A conductive resistance sheet having the same shape as that of FIG. 4(a), preferably, a wrinkled conductive resistance sheet 63 may be provided at a peripheral portion of the pipeline 64. Accordingly, a heat transfer path may be lengthened, and deformation caused by a pressure difference may be prevented. In addition, a separate shielding part may be provided to improve the adiabatic performance of the conductive resistance sheet.

A heat transfer path between the first and second plate members 10 and 20 will be described with reference back to FIG. 4(a). Heat passing through the vacuum adiabatic body may be divided into surface conduction heat ① conducted along a surface of the vacuum adiabatic body, more specifically, the conductive resistance sheet 60, supporter conduction heat ② conducted along the supporting unit 30 provided inside the vacuum adiabatic body, gas conduction heat ③ conducted through an internal gas in the vacuum space part, and radiation transfer heat ④ transferred through the vacuum space part.

The transfer heat may be changed depending on various depending on various design dimensions. For example, the supporting unit may be changed such that the first and second plate members 10 and 20 may endure a vacuum pressure without being deformed, the vacuum pressure may be changed, the distance between the plate members may be changed, and the length of the conductive resistance sheet may be changed. The transfer heat may be changed depending on a difference in temperature between the spaces (the first and second spaces) respectively provided by the plate members. In the embodiment, a preferred configuration of the vacuum adiabatic body has been found by considering that its total heat transfer amount is smaller than that of a typical adiabatic structure formed by foaming polyurethane. In a typical refrigerator including the adiabatic structure formed by foaming the polyurethane, an effective heat transfer coefficient may be proposed as 19.6 mW/mK.

By performing a relative analysis on heat transfer amounts of the vacuum adiabatic body of the embodiment, a heat transfer amount by the gas conduction heat ③ may become smallest. For example, the heat transfer amount by the gas conduction heat ③ may be controlled to be equal to or smaller than 4% of the total heat transfer amount. A heat transfer amount by solid conduction heat defined as a sum of the surface conduction heat ① and the supporter conduction heat ② is largest. For example, the heat transfer amount by the solid conduction heat may reach 75% of the total heat transfer amount. A heat transfer amount by the radiation transfer heat ③ is smaller than the heat transfer amount by the solid conduction heat but larger than the heat transfer amount of the gas conduction heat. For example, the heat transfer amount by the radiation transfer heat ③ may occupy about 20% of the total heat transfer amount.

According to such a heat transfer distribution, effective heat transfer coefficients (eK: effective K) (W/mK) of the surface conduction heat ①, the supporter conduction heat ②, the gas conduction heat ③, and the radiation transfer heat ④ may have an order of Math Equation 1.

$$eK_{solid\ conduction\ heat} > eK_{radiation\ transfer\ heat} > eK_{gas\ conduction\ heat}$$ [Equation 1]

Here, the effective heat transfer coefficient (eK) is a value that may be measured using a shape and temperature differences of a target product. The effective heat transfer coefficient (eK) is a value that may be obtained by measuring a total heat transfer amount and a temperature at least one portion at which heat is transferred. For example, a calorific value (W) is measured using a heating source that may be quantitatively measured in the refrigerator, a temperature distribution (K) of the door is measured using heats respectively transferred through a main body and an edge of the door of the refrigerator, and a path through which heat is transferred is calculated as a conversion value (m), thereby evaluating an effective heat transfer coefficient.

The effective heat transfer coefficient (eK) of the entire vacuum adiabatic body is a value given by k=QL/AΔT. Here, Q denotes a calorific value (W) and may be obtained using a calorific value of a heater. A denotes a sectional area (m2) of the vacuum adiabatic body, L denotes a thickness (m) of the vacuum adiabatic body, and ΔT denotes a temperature difference.

For the surface conduction heat, a conductive calorific value may be obtained through a temperature difference (ΔT) between an entrance and an exit of the conductive resistance sheet 60 or 63, a sectional area (A) of the conductive resistance sheet, a length (L) of the conductive resistance sheet, and a thermal conductivity (k) of the conductive resistance sheet (the thermal conductivity of the conductive resistance sheet is a material property of a material and may be obtained in advance). For the supporter conduction heat, a conductive calorific value may be obtained through a temperature difference (ΔT) between an entrance and an exit of the supporting unit 30, a sectional area (A) of the supporting unit, a length (L) of the supporting unit, and a thermal conductivity (k) of the supporting unit. Here, the thermal conductivity of the supporting unit is a material property of a material and may be obtained in advance. The sum of the gas conduction heat ③, and the radiation transfer heat ④ may be obtained by subtracting the surface conduction heat and the supporter conduction heat from the heat transfer amount of the entire vacuum adiabatic body. A ratio of the gas conduction heat ③, and the radiation transfer heat ④ may be obtained by evaluating radiation transfer heat when no gas conduction heat exists by remarkably lowering a vacuum degree of the vacuum space part 50.

When a porous material is provided inside the vacuum space part 50, porous material conduction heat ⑤ may be a sum of the supporter conduction heat ② and the radiation transfer heat ④. The porous material conduction heat may be changed depending on various variables including a kind, an amount, and the like of the porous material.

According to an embodiment, a temperature difference ΔT1 between a geometric center formed by adjacent bars 31 and a point at which each of the bars 31 is located may be preferably provided to be less than 0.5° C. Also, a temperature difference ΔT2 between the geometric center formed by the adjacent bars 31 and an edge portion of the vacuum adiabatic body may be preferably provided to be less than 0.5° C. In the second plate member 20, a temperature difference between an average temperature of the second plate and a temperature at a point at which a heat transfer path passing through the conductive resistance sheet 60 or 63 meets the second plate may be the largest. For example, when the second space is a region hotter than the first space, the temperature at the point at which the heat transfer path passing through the conductive resistance sheet meets the second plate member becomes the lowest. Similarly, when the second space is a region colder than the first space, the temperature at the point at which the heat transfer path passing through the conductive resistance sheet meets the second plate member becomes the highest.

This means that the amount of heat transferred through other points except the surface conduction heat passing through the conductive resistance sheet should be controlled, and the entire heat transfer amount satisfying the vacuum adiabatic body may be achieved only when the surface conduction heat occupies the largest heat transfer amount. To this end, a temperature variation of the conductive resistance sheet may be controlled to be larger than that of the plate member.

Physical characteristics of the parts constituting the vacuum adiabatic body will be described. In the vacuum adiabatic body, a force by vacuum pressure is applied to all of the parts. Therefore, a material having a strength (N/m2) of a certain level may be preferably used.

Under such circumferences, the plate members 10 and 20 and the side frame 70 may be preferably made of a material having a sufficient strength with which they are not damaged by even vacuum pressure. For example, when the number of bars 31 is decreased so as to limit the support conduction heat, deformation of the plate member occurs due to the vacuum pressure, which may bad influence on the external appearance of refrigerator. The radiation resistance sheet 32 may be preferably made of a material that has a low emissivity and may be easily subjected to thin film processing. Also, the radiation resistance sheet 32 is to ensure a strength enough not to be deformed by an external impact. The supporting unit 30 is provided with a strength enough to support the force by the vacuum pressure and endure an external impact, and is to have machinability. The conductive resistance sheet 60 may be preferably made of a material that has a thin plate shape and may endure the vacuum pressure.

In an embodiment, the plate member, the side frame, and the conductive resistance sheet may be made of stainless materials having the same strength. The radiation resistance sheet may be made of aluminum having a weaker strength that the stainless materials. The supporting unit may be made of resin having a weaker strength than the aluminum.

Unlike the strength from the point of view of materials, analysis from the point of view of stiffness is required. The stiffness (N/m) is a property that would not be easily deformed. Although the same material is used, its stiffness may be changed depending on its shape. The conductive resistance sheets 60 or 63 may be made of a material having a strength, but the stiffness of the material is preferably low so as to increase heat resistance and minimize radiation heat as the conductive resistance sheet is uniformly spread without any roughness when the vacuum pressure is applied. The radiation resistance sheet 32 requires a stiffness of a certain level so as not to contact another part due to deformation. Particularly, an edge portion of the radiation resistance sheet may generate conduction heat due to drooping caused by the self-load of the radiation resistance sheet. Therefore, a stiffness of a certain level is required. The supporting unit 30 requires a stiffness enough to endure a compressive stress from the plate member and an external impact.

In an embodiment, the plate member and the side frame may preferably have the highest stiffness so as to prevent deformation caused by the vacuum pressure. The supporting unit, particularly, the bar may preferably have the second highest stiffness. The radiation resistance sheet may preferably have a stiffness that is lower than that of the supporting unit but higher than that of the conductive resistance sheet. Lastly, the conductive resistance sheet may be preferably made of a material that is easily deformed by the vacuum pressure and has the lowest stiffness.

Even when the porous material 33 is filled in the vacuum space part 50, the conductive resistance sheet may preferably have the lowest stiffness, and the plate member and the side frame may preferably have the highest stiffness.

Hereinafter, a vacuum pressure preferably determined depending on an internal state of the vacuum adiabatic body. As already described above, a vacuum pressure is to be maintained inside the vacuum adiabatic body so as to reduce heat transfer. At this time, it will be easily expected that the vacuum pressure is preferably maintained as low as possible so as to reduce the heat transfer.

The vacuum space part may resist to heat transfer by only the supporting unit 30. Here, a porous material 33 may be filled with the supporting unit inside the vacuum space part 50 to resist to the heat transfer. The heat transfer to the porous material may resist without applying the supporting unit.

The case where only the supporting unit is applied will be described.

Figure 5:
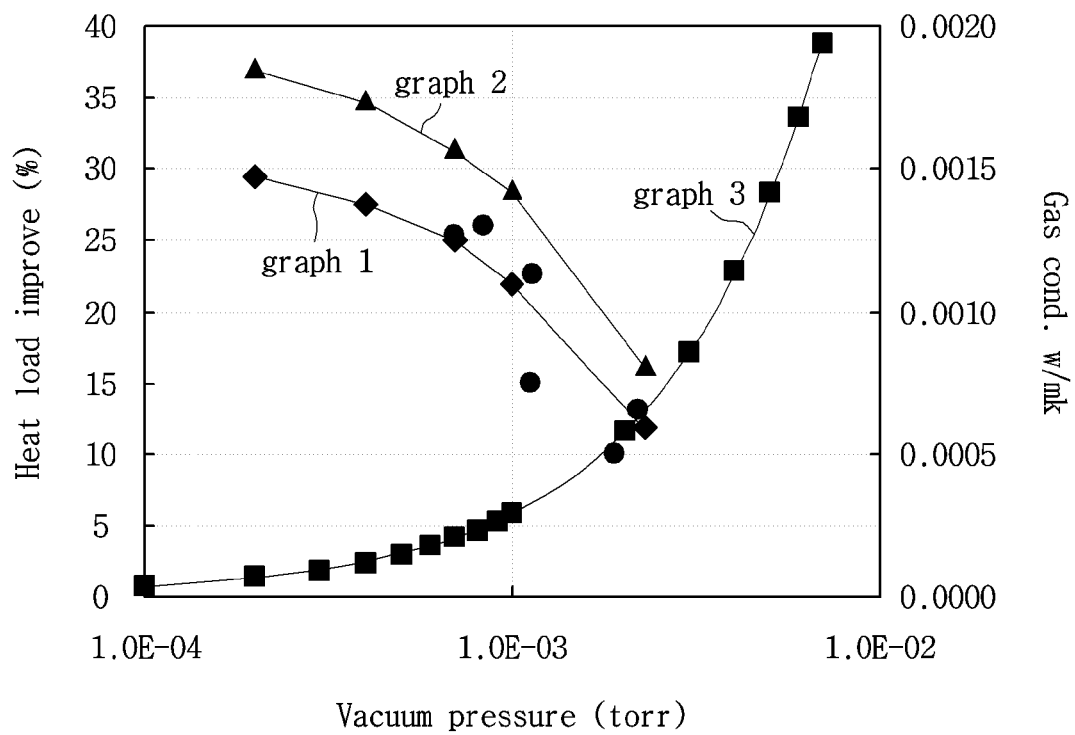
FIG. 5 is a graph illustrating a variation in adiabatic performance and a variation in gas conductivity according to a vacuum pressure by applying a simulation.

FIG. 5 illustrates graphs showing changes in adiabatic performance and changes in gas conductivity with respect to vacuum pressures by applying a simulation.

Referring to FIG. 5, it may be seen that, as the vacuum pressure is decreased, i.e., as the vacuum degree is increased, a heat load in the case of only the main body (Graph 1) or in the case where the main body and the door are joined together (Graph 2) is decreased as compared with that in the case of the typical product formed by foaming polyurethane, thereby improving the adiabatic performance. However, it may be seen that the degree of improvement of the adiabatic performance is gradually lowered. Also, it may be seen that, as the vacuum pressure is decreased, the gas conductivity (Graph 3) is decreased. However, it may be seen that, although the vacuum pressure is decreased, the ratio at which the adiabatic performance and the gas conductivity are improved is gradually lowered. Therefore, it is preferable that the vacuum pressure is decreased as low as possible. However, it takes long time to obtain excessive vacuum pressure, and much cost is consumed due to excessive use of a getter. In the embodiment, an optimal vacuum pressure is proposed from the above-described point of view.

Figure 6:
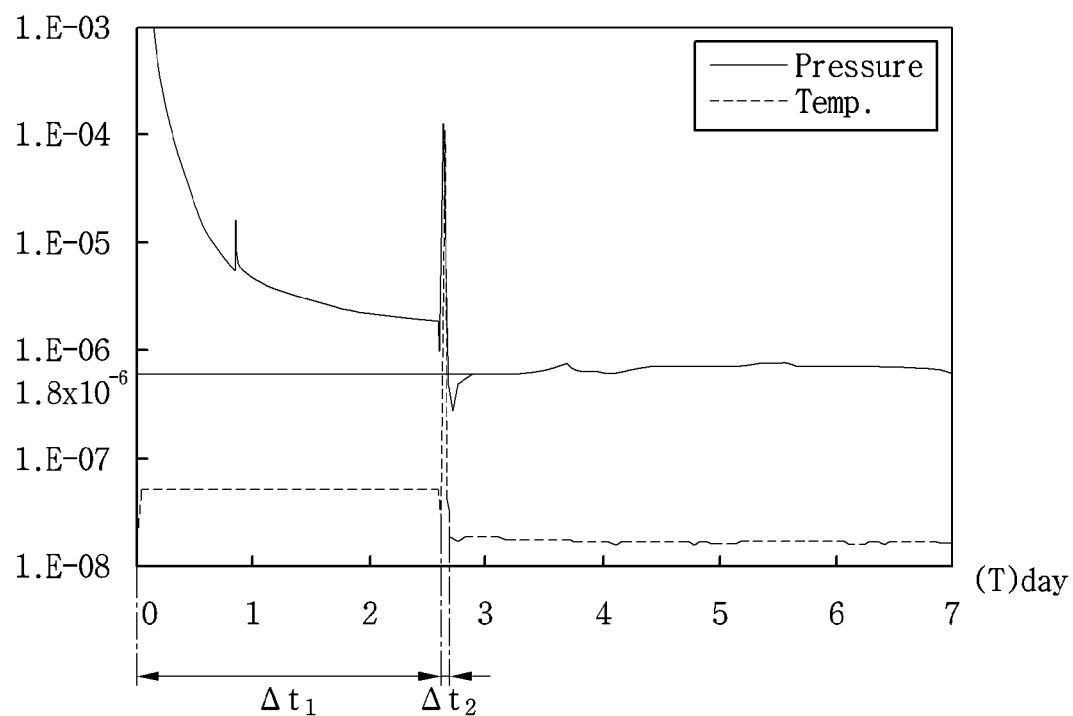
FIG. 6 is a graph illustrating results obtained by observing a time and a pressure in a process of exhausting the inside of the vacuum adiabatic body when a supporting unit is used.

FIG. 6 is a graph illustrating results obtained by observing a time and a pressure in a process of exhausting the inside of the vacuum adiabatic body when a supporting unit is used.

Referring to FIG. 6, in order to create the vacuum space part 50 to be in the vacuum state, a gas in the vacuum space part 50 is exhausted by a vacuum pump while evaporating a latent gas remaining in the parts of the vacuum space part 50 through baking. However, if the vacuum pressure reaches a certain level or more, there exists a point at which the level of the vacuum pressure is not increased any more ($\Delta T1$). After that, the getter is activated by disconnecting the vacuum space part 50 from the vacuum pump and applying heat to the vacuum space part 50 ($\Delta T2$). If the getter is activated, the pressure in the vacuum space part 50 is decreased for a certain period of time, but then normalized to maintain a vacuum pressure of a certain level. The vacuum pressure that maintains the certain level after the activation of the getter is approximately $1.8 \times 10^{-6}$ Torr.

In the embodiment, a point at which the vacuum pressure is not substantially decreased any more even though the gas is exhausted by operating the vacuum pump is set to the lowest limit of the vacuum pressure used in the vacuum adiabatic body, thereby setting the minimum internal pressure of the vacuum space part 50 to $1.8 \times 10^{-6}$ Torr.

Figure 7:
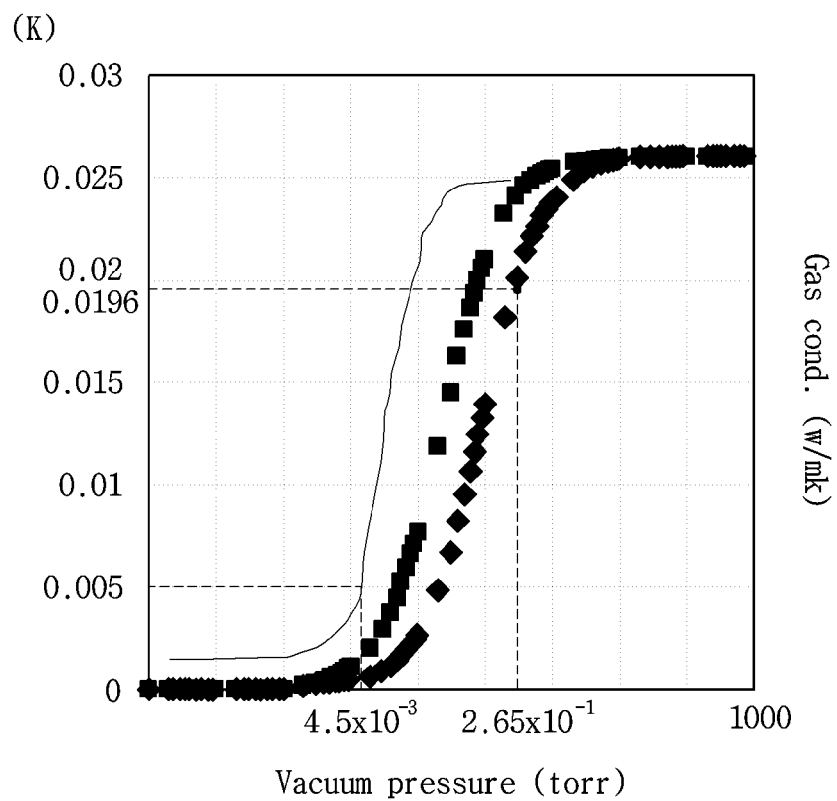
FIG. 7 is a graph illustrating results obtained by comparing a vacuum pressure with gas conductivity.

FIG. 7 is a graph obtained by comparing a vacuum pressure with gas conductivity.

Referring to FIG. 7, gas conductivities with respect to vacuum pressures depending on sizes of a gap in the vacuum space part 50 are represented as graphs of effective heat transfer coefficients (eK). Effective heat transfer coefficients (eK) were measured when the gap in the vacuum space part 50 has three sizes of 2.76 mm, 6.5 mm, and 12.5 mm. The gap in the vacuum space part 50 is defined as follows. When the radiation resistance sheet 32 exists inside vacuum space part 50, the gap is a distance between the radiation resistance sheet 32 and the plate member adjacent thereto. When the radiation resistance sheet 32 does not exist inside vacuum space part 50, the gap is a distance between the first and second plate members.

It was seen that, since the size of the gap is small at a point corresponding to a typical effective heat transfer coefficient of 0.0196 W/mK, which is provided to a adiabatic material formed by foaming polyurethane, the vacuum pressure is $2.65 \times 10^{-1}$ Torr even when the size of the gap is 2.76 mm. Meanwhile, it was seen that the point at which reduction in adiabatic effect caused by gas conduction heat is saturated even though the vacuum pressure is decreased is a point at which the vacuum pressure is approximately $4.5 \times 10^{-3}$ Torr. The vacuum pressure of $4.5 \times 10^{-3}$ Torr may be defined as the point at which the reduction in adiabatic effect caused by gas conduction heat is saturated. Also, when the effective heat transfer coefficient is 0.1 W/mK, the vacuum pressure is $1.2 \times 10^{-2}$ Torr.

When the vacuum space part 50 is not provided with the supporting unit but provided with the porous material, the size of the gap ranges from a few micrometers to a few hundreds of micrometers. In this case, the amount of radiation heat transfer is small due to the porous material even when the vacuum pressure is relatively high, i.e., when the vacuum degree is low. Therefore, an appropriate vacuum pump is used to adjust the vacuum pressure. The vacuum pressure appropriate to the corresponding vacuum pump is approximately $2.0 \times 10^{-4}$ Torr. Also, the vacuum pressure at the point at which the reduction in adiabatic effect caused by gas conduction heat is saturated is approximately $4.7 \times 10^{-2}$ Torr. Also, the pressure where the reduction in adiabatic effect caused by gas conduction heat reaches the typical effective heat transfer coefficient of 0.0196 W/mK is 730 Torr.

When the supporting unit and the porous material are provided together in the vacuum space part, a vacuum pressure may be created and used, which is middle between the vacuum pressure when only the supporting unit is used and the vacuum pressure when only the porous material is used. When only the porous material is used, the lowest vacuum pressure may be used.

Figure 8:
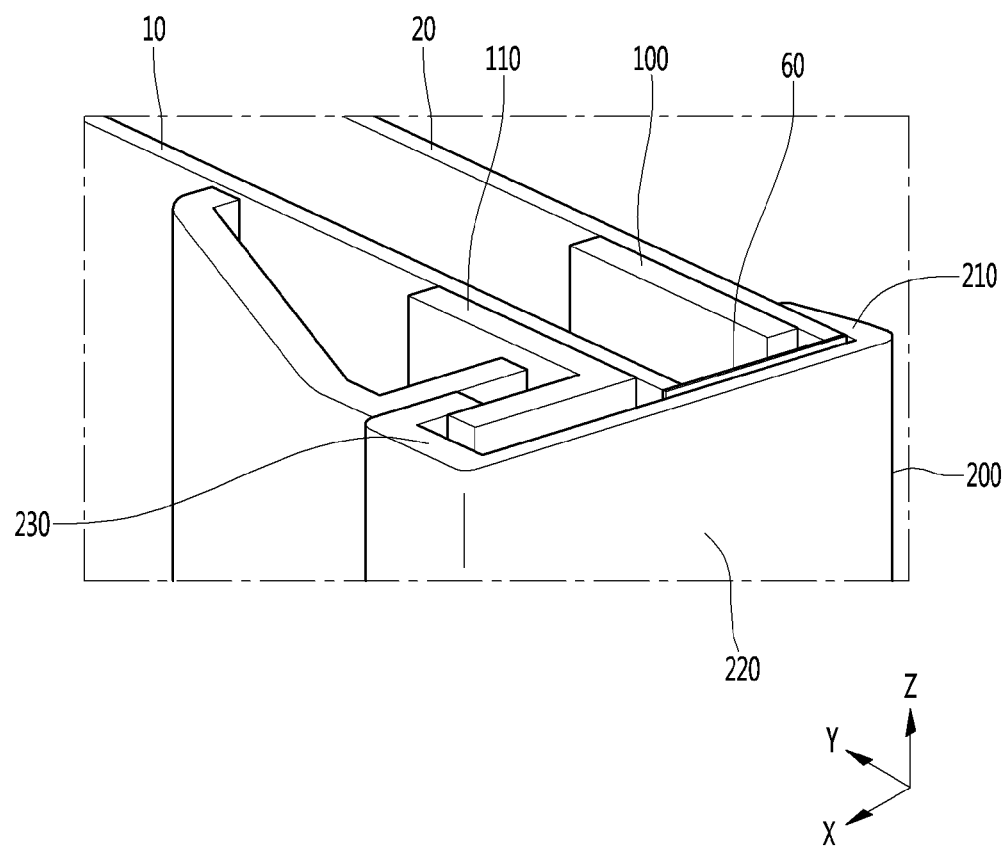
FIG. 8 is a cross-sectional perspective view of an edge of the vacuum adiabatic body.

FIG. 8 is a cross-sectional perspective view of an edge of the vacuum adiabatic body.

Referring to FIG. 8, a first plate member 10, a second plate member 20, and a conductive resistance sheet 60 are provided. The conductive resistance sheet 60 may be provided as a thin plate to resist to thermal conduction between the plate members 10 and 20. Although the conductive resistance sheet 60 is provided as a flat plan shape as a thin plate, the conductive resistance sheet 60 may have a curved shape by being pulled inward when vacuum is applied to the vacuum space part 50.

Since the conductive resistance sheet 60 has the thin plate shape and low strength, the conductive resistance sheet 60 may be damaged by even an external small impact. As a result, when the conductive resistance sheet 60 is damaged, the vacuum of the vacuum space part may be broken, and thus, performance of the vacuum adiabatic body may not be properly exerted. To solve this limitation, a sealing frame 200 may be disposed on an outer surface of the conductive resistance sheet 60. According to the sealing frame 200, components of the door 3 or other components may not directly contact the conductive resistance sheet 60 but indirectly contact the conductive resistance sheet 60 through the sealing frame 200 to prevent the conductive resistance sheet 60 from being damaged. To allow the sealing frame 200 to prevent an impact from being applied to the conductive resistance sheet 60, the two members may be spaced apart from each other, and a buffer member may be interposed between the two members.

To reinforce the strength of the vacuum adiabatic body, a reinforcement member may be provided on each of the plate members 10 and 20. For example, the reinforcement member may include a first reinforcement member 100 coupled to an edge portion of the second plate member 10 and a second reinforcement member 110 coupled to an edge portion of the first plate member 10. To improve the strength of the vacuum adiabatic body, a member having a thickness and strength greater than those of the plate member 10 may be applied to the reinforcement members 100 and 110. The first reinforcement member 100 may be provided in an internal space of the vacuum space part 50, and the second reinforcement member 110 may be provided on an inner surface part of the main body 2.

The conductive resistance sheet 60 may not contact the reinforcement members 100 and 110. This is done because thermal conductive resistance characteristics generated in the conductive resistance sheet 60 is destroyed by the reinforcement members. That is to say, a width of a narrow heat bridge (heat bridge) that resists to the thermal conduction is greatly expanded by the reinforcement member, and the narrow heat bridge characteristics are destroyed.

Since the width of the internal space of the vacuum space part 50 is narrow, the first reinforcement member 100 may be provided in a flat plate shape in cross-section. The second reinforcement member 110 provided on the inner surface of the main body 2 may be provided in a shape of which a cross-section is bent.

The sealing frame 200 may include an inner surface part 230 disposed in the internal space of the main body 2 and supported by the first plate member 10, an outer surface part 210 disposed in the external space of the main body 2 and supported by the second plate member 20, and a side surface part 220 disposed on a side surface of the edge of the vacuum adiabatic body constituting the main body 2 to cover the conductive resistance sheet 60 and connect the inner surface part 230 to the outer surface part 210.

The sealing frame 200 may be made of a resin material that is slightly deformable. A mounted position of the sealing frame 200 may be maintained by an interaction between the inner surface part 230 and the outer surface part 210, i.e., by a holding action. That is to say, the set position may not be separated.

The position fixing of the sealing frame 200 will be described in detail.

First, movement of the plate members 10 and 20 in the extension direction (a y-axis direction in FIG. 8) on the plane may be fixed by being supported by the inner surface part 230 by being hooked on the second reinforcement member 110. In more detail, the sealing frame 200 may move out of the vacuum adiabatic body by interfering with the inner surface part 230 of the second reinforcement member 110. On the other hand, the movement of the sealing frame 200 to the inside of the vacuum adiabatic body may be interrupted by at least one action of first action in which the inner surface part 230 is hooked to be supported by the second reinforcement member 110 (this action may act in both directions in addition to elastic restoring force of the sealing frame made of a resin), second action in which the side surface part 220 is stopped with respect to the plate member 10, and third action in which the inner surface part 230 prevents the first plate member 10 from moving in the y-axis direction.

The movement of the sealing frame 200 in the vertical extension direction (an x-axis direction in FIG. 8) with respect to the cross-section of the plate members 10 and 20 may be fixed by hooking and supporting the outer surface part 210 to the second plate member 20. In the auxiliary action, the movement of the sealing frame 200 in the x-axis direction may be interrupted by the action of hooking the second reinforcement member 110 and the folding action.

The movement of the sealing frame 200 in the extension direction (a z-axis direction in FIG. 8) may be stopped by at least one of first action in which the inner surface part 230 of one sealing frame 200 contacts the inner surface of the other sealing frame 200 and second action in which the inner surface part 230 of one sealing frame 200 contacts a mullion 300.

Figure 9:
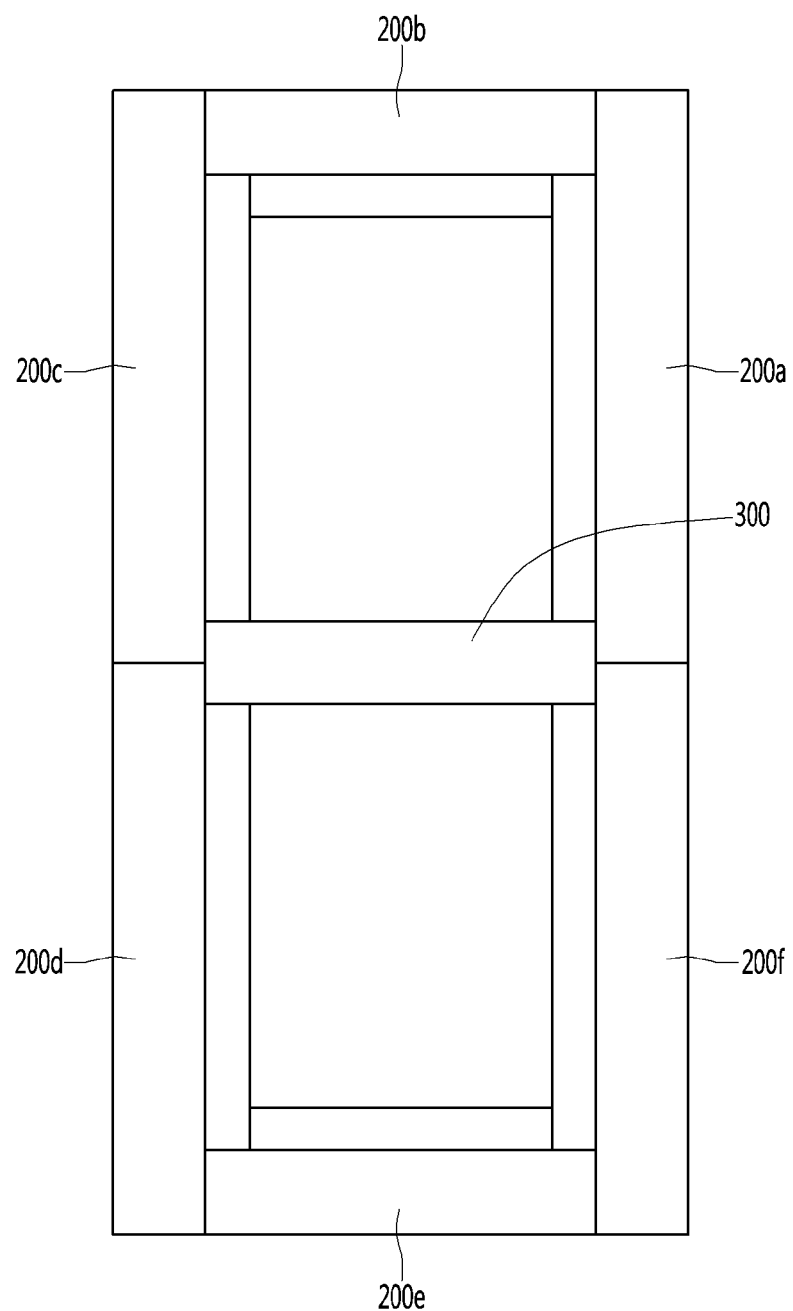
FIGS. 9 and 10 are schematic front views of a main body in a virtual state in which an inner surface part is spread.
Figure 10:
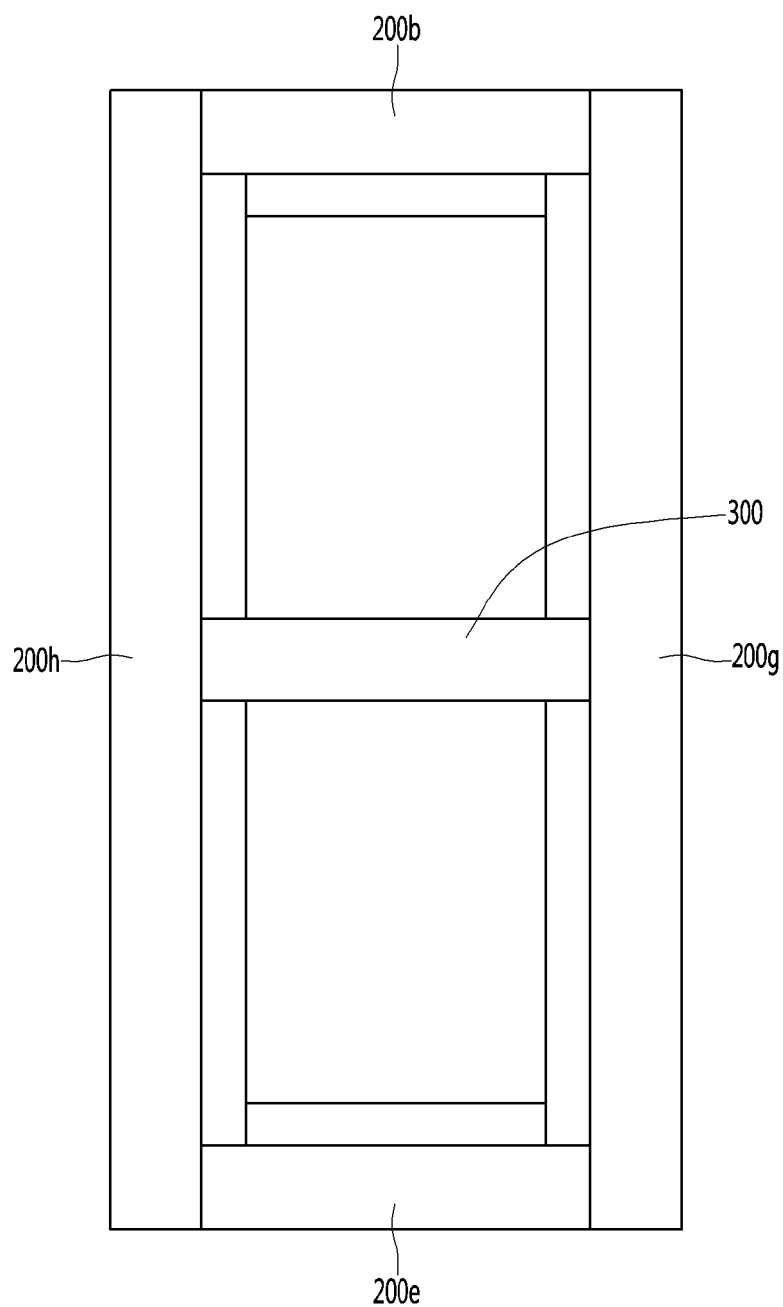

FIGS. 9 and 10 are schematic views of the main body when viewed from the front side. In the drawings, it should be noted that the sealing frame 200 shows a virtual state in which the inner surface part 230 is spread in a direction parallel to the side surface part 220.

Referring to FIGS. 9 and 10, the sealing frame 200 may include members 200*b* and 200*e* that respectively seal upper and lower edges of the main body 2. The side edge of the main body 2 may be divided according to whether the spaces within the refrigerator, which are divided on the basis of the mullion 300, are separately (in FIG. 9) or integrally (in FIG. 10) sealed.

When the side edge of the main body 2 is separated as shown in FIG. 9, it may be divided into four sealing frames 200*a*, 200*c*, 200*d* and 200*f*. When the side edge of the main body 2 is integrally sealed as shown in FIG. 10, it may be divided into two sealing frames 200*g* and 200*c*.

When the side edge of the main body 2 is sealed with the two sealing frames 200*g* and 200*c* as shown in FIG. 10, since two coupling operations may be required, the manufacturing may be facilitated. However, it is necessary to cope with such a limitation because there is a risk of a loss of cold air.

In the case of sealing the side edge of the main body 2 with the four sealing frames 200*a*, 200*c*, 200*d* and 200*f* as shown in FIG. 9, four coupling operations may be required, and thus, the manufacturing may be inconvenient. However, the thermal conduction may be interrupted to reduce the heat transfer between the separated storage rooms, thereby reducing the loss of the cold air.

The embodiment of the vacuum adiabatic body shown in FIG. 8 may be preferably exemplify the vacuum adiabatic body on the main body. However, it does not exclude that it is provided to the door-side vacuum adiabatic body. Since a gasket is installed on the door 3, the sealing frame 200 may be disposed on the main body-side vacuum adiabatic body. In this case, the side surface part 220 of the sealing frame 200 may further have the advantage that the gasket provides a sufficient width for the contact.

In more detail, since the width of the side surface part 220 is wider than the adiabatic thickness of the vacuum adiabatic body, that is, the width of the vacuum adiabatic body, an adiabatic width of the gasket may be provided at a sufficiently wide width. For example, when the adiabatic thickness of the vacuum adiabatic body is about 10 mm, there is an advantage that the storage space of the refrigerator is enlarged by providing a large storage space in the cavity. However, there is a problem that the gap of about 10 mm does not provide a sufficient gap for the contact of the gasket. In this case, since the side surface part 220 provides a wide gap corresponding to the contact area of the gasket, it is possible to effectively prevent the cold air from being lost through the contact interval between the main body 2 and the door 3. That is, when the contact width of the gasket is about 20 mm, even though the width of the side surface part 220 may be about 20 mm or more, the side surface part 220 may have a width about 20 mm or more to corresponding to the contact width of the gasket.

It may be understood that the sealing frame 200 performs the shielding of the conductive resistance sheet and the sealing function to prevent the cold air from being lost.

Figure 11:
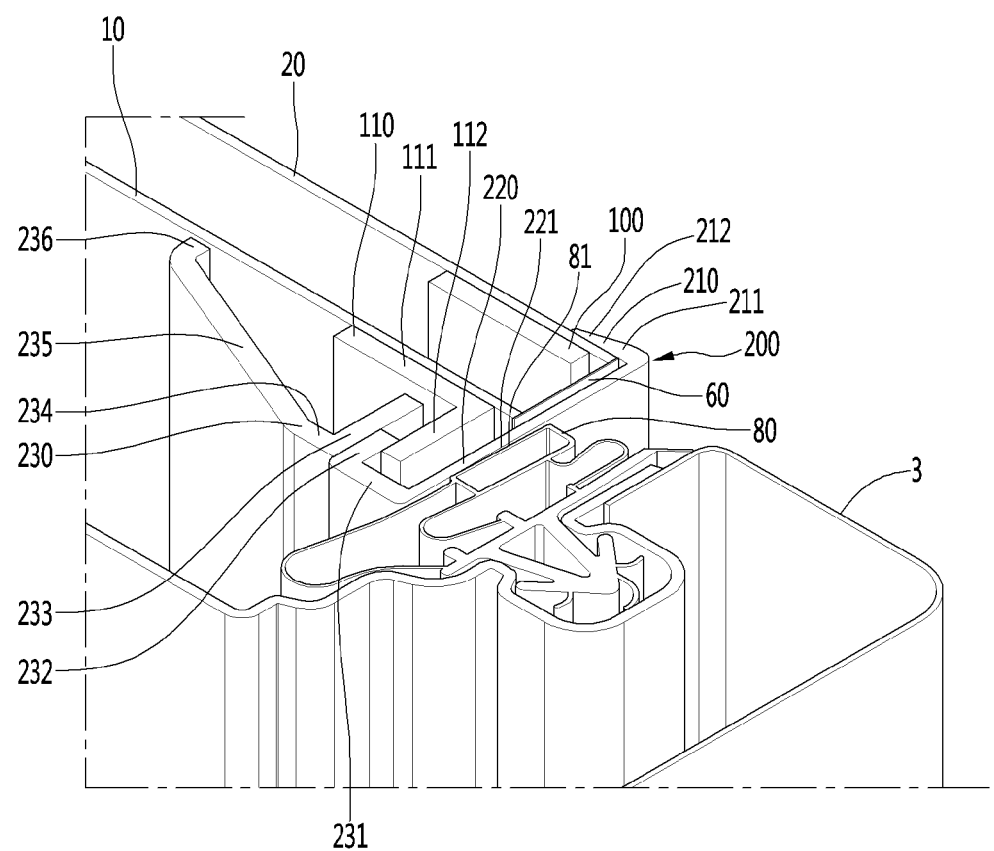
FIG. 11 is a cross-sectional view of a contact part in a state in which the main body is closed by the door.

FIG. 11 is a cross-sectional view of a contact part in a state in which the main body is closed by the door.

Referring to FIG. 11, the gasket 80 is disposed between the main body 2 and the door 3. The gasket 80 may be coupled to the door 3 and provided as a member that is made of a soft deformable material. The gasket 80 includes a magnet as one component. When the magnet approaches by pulling a magnetic body (i.e., a magnetic body of an edge portion of the main body), a contact surface between the main body 2 and the door 3 may be blocked by the sealing surface having a predetermined width due to the smooth deformation of the gasket 80.

In detail, when a gasket sealing surface 81 of the gasket contacts the side surface part 220, a sealing surface 221 of the side surface part having a sufficient width may be provided. The sealing surface 221 of the side surface part may be defined as a contact surface on the side surface part 220 which is in contact with the gasket sealing surface 81 when the gasket 80 contacts the side surface part 220.

Thus, it is possible to secure the sealing surfaces 81 and 221 having a sufficient area irrespective of the adiabatic thickness of the vacuum adiabatic body. This is because even if the adiabatic thickness of the vacuum adiabatic body is narrow, and the adiabatic thickness of the vacuum adiabatic body is narrower than the gasket sealing surface 81, if the width of the side surface part 220 increases, the sealing surface 221 of the side surface part having the sufficient width may be obtained. In addition, the sealing surfaces 81 and 221 having the sufficient area may be ensured irrespective of the deformation of the member, which may affect the deformation of the contact surface between the main body and the door. This is because it is possible to provide a predetermined clearance in and out of the side surface sealing surface 221 in designing the side surface part 220 so that even if the slight deformation occurs between the sealing surfaces 81 and 221, the width and area may be maintained.

In the sealing frame 200, the outer surface part 210, the side surface part 220, and the inner surface part 230 may be provided, and their set positions may be maintained. Briefly, the outer surface part 210 and the inner surface part 230 may be provided in a shape, i.e., a recessed groove shape that is capable of holding end portion of the vacuum adiabatic body, more particularly, the plate members 10 and 20. Here, it may be understood that the recessed groove has a configuration of a recessed groove as a constitution in which a width between the end portions of the outer surface part 210 and the inner surface part 230 is less than the width of the side surface part 220.

The coupling of the sealing frame 200 will be briefly described. First, the side surface part 220 and the outer surface part 210 rotate in the direction of the second plate member 20 in a state in which the inner surface part 230 is hooked with the second reinforcement member 110. Thus, the sealing frame 200 is elastically deformed, and the outer surface part 210 may move inward along the outer surface of the second plate member 20 to complete the coupling. When the coupling of the sealing frame is completed, the sealing frame may return to its original shape before being deformed. When the coupling is completed, the installation position may be maintained as described above.

Detailed configuration and operation of the sealing frame 200 will be described.

The outer surface part 210 is provided with an extension part 211 that extends to the outside of the refrigerator (hereinafter, referred to as an outward extension part), which extends inward from an end of the second plate member 20 and a contact part 212 outside the refrigerator (hereinafter, referred to as an outside contact part), which contacts the outer surface of the second plate member 20 at an end of the outside extension part 211.

The outward extension part 211 may have a predetermined length to prevent the outer surface part 210 from being separated by external weak force. That is to say, even though the outer surface part 210 is forced to be pulled toward the door due to carelessness of the user, the outer surface part 210 may not be completely separated from the second plate member 20. However, if it is excessively long, there is difficulty in intentional removal at the time of repair, and it is preferable that the length is limited to a predetermined length because the coupling operation becomes difficult.

The outside contact portion 212 may be provided with a structure in which an end of the outside extension part 211 is slightly bent toward the outer surface of the second plate member 20. Thus, the sealing due to the contact between the outer surface part 210 and the second plate member 20 may be completed to prevent foreign substances from being introduced.

The side surface part 220 is bent at an angle of about 90 degrees from the outer surface part 210 toward the opening of the main body 2 and is provided with a width enough to secure the sufficient width of the side surface sealing surface 221. The side surface part 220 may be provided thinner than the inner surface part 210 and the outer surface part 230. This is for the purpose of permitting the elastic deformation at the time of coupling or removing the sealing frame 200 and the purpose of not permitting a distance to cause magnetic force between the magnet disposed on the gasket 80 and the magnetic body on the side of the body so that the magnetic force is weakened. The side surface part 220 may have a purpose of protecting the conductive resistance sheet 60 and arranging an outer appearance as an exposed portion of the outside. When the adiabatic member is provided inside the side surface part 220, the adiabatic performance of the conductive resistance sheet 60 may be reinforced.

The inner surface part 230 extends from the side surface part 220 in the direction of the inside of the refrigerator, that is, in the rear surface direction of the main body, at about 90 degrees. The inner surface part 230 may perform an action for fixing the sealing frame 200, an operation for installing components that is necessary for operation of a product to which the vacuum adiabatic body is installed, such as a refrigerator, and an operation for preventing an external inflow of foreign substances.

The operation corresponding to each constituent of the inner surface part 230 will be described.

The inner surface part 230 is provided with an extension part 231 that extends to inside of the refrigerator (hereinafter, referred to as an inward extension part), which is bent from an inner end of the side surface part 220 to extend and a first member coupling part 232 bent from an inner end of the inward extension part 231, i.e., toward the inner surface of the first plate member 10. The first member coupling part 232 may contact a protrusion part 112 of the second reinforcement part 110 so as to be hooked. The inward extension part 231 may provide an interval extending toward the inside of the refrigerator so that the first member coupling part 232 is hooked with the inside of the second reinforcement member 110.

Since the first member coupling part 232 is hooked with the second reinforcement member 110, the supporting operation of the sealing frame 200 may be realized. The second reinforcement member 110 may further include a base part 111 coupled to the first plate member 10 and a protrusion part 112 bent and extending from the base part 111. An inertia moment of the second reinforcement member 110 may increase by a structure of the base part 111 and the protruding part 112 so that ability to resist the bending strength increases.

The first member coupling part 232 and the second member coupling part 233 may be coupled to each other. The first and second member coupling parts 232 and 233 may be provided as separate members to be coupled to each other or may be provided as a single member from the design stage.

A gas formation part 234 that further extends from the inner end of the second member coupling part 233 to the inside of the refrigerator may be further provided. The gap formation part 234 may serve as a portion for providing a space or a space in which components necessary for operation of the appliance such as the refrigerator provided with the vacuum adiabatic body are disposed.

An inclined part 235 that is inclined to the inside of the refrigerator (hereinafter, referred to as an inward inclined part) is further provided. The inward inclined part 235 may be provided so as to be inclined toward the end, that is, toward the first plate member 10 toward the inside of the refrigerator. The inward inclined part 235 may be provided so that a gap between the sealing frame and the first plate member becomes smaller inward. Thus, it is possible to secure a space for mounting a component such as a lamp by cooperation with the gap forming portion 234 while minimizing the volume occupying the internal space of the sealing frame 200 as much as possible.

An inside contact part 236 is disposed on an inner end of the inward inclined part 235. The inside contact portion 236 may be provided with a structure in which an end of the inward inclined part 235 is slightly bent toward the inner surface of the second plate member 10. Thus, the sealing due to the contact between the inner surface part 230 and the second plate member 10 may be completed to prevent foreign substances from being introduced.

When an accessory part such as a lamp is installed on the inner surface part 230, the inner surface part 230 may be divided into two parts to achieve the purpose of the installation convenience of the part. For example, the inner surface part 230 may be divided into a first member for providing the inward extending portion 231 and the first member coupling part 232 and a second member providing the second member coupling part 233, the gap formation part 234, the inward inclined part 235, and inside contact part 236. In a state in which an product such as the lamp is mounted on the second member, the first member and the second member may be coupled to each other in such a manner that the second member coupling part 233 is coupled to the first member coupling part 232. Alternatively, it does not exclude that the inner surface part 230 is provided in more various manners. For example, the inner surface part 230 may be provided as a single member.

Figure 12:
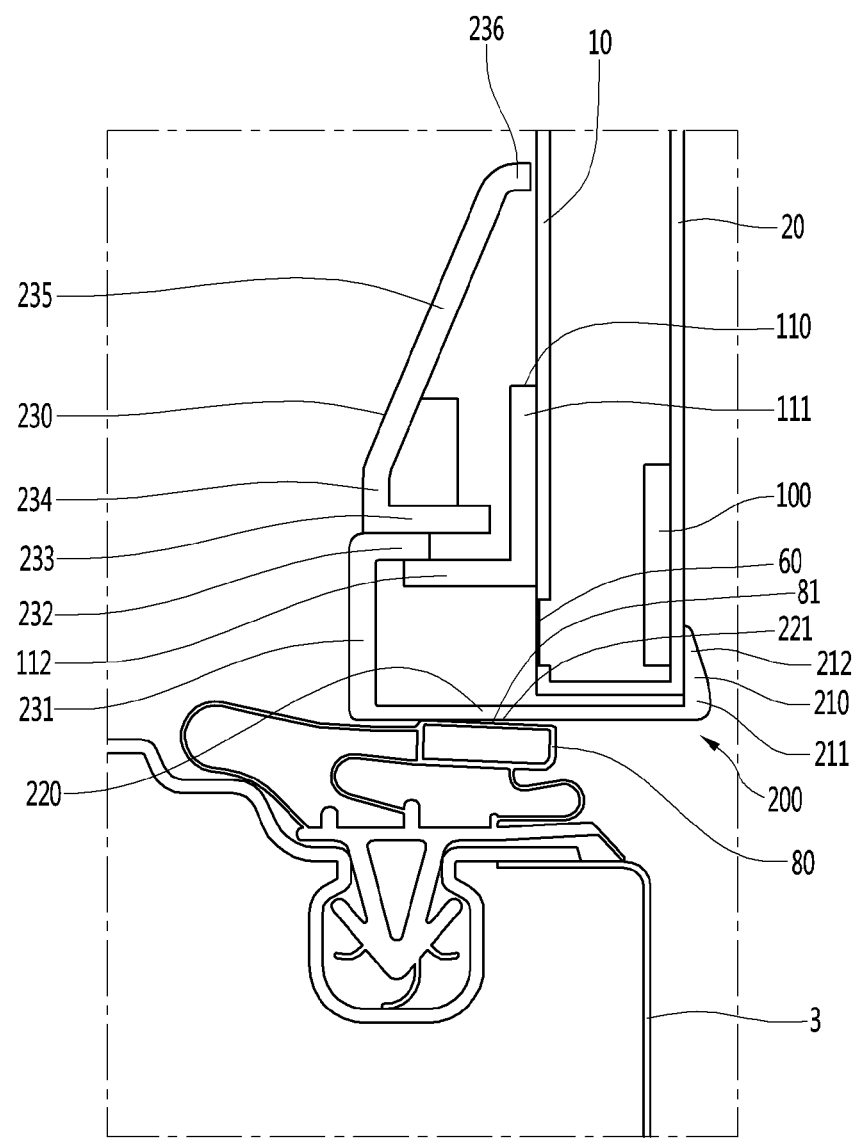
FIG. 12 is a cross-sectional view illustrating a contact part of a main body and a door according to another embodiment.

FIG. 12 is a cross-sectional view illustrating a contact part of a main body and a door according to another embodiment. This embodiment is characteristically different in the position of the conductive resistance sheet and accordingly the change of other portions.

Referring to FIG. 12, in this embodiment, the conductive resistance sheet 60 may be provided inside the refrigerator, but not provided on the edge portion of the end of the vacuum adiabatic body. The second plate member 20 may extend over the outside of the refrigerator and the edge portion of the vacuum adiabatic body. In some cases, the second plate member 20 may extend by a predetermined length up to the inside of the refrigerator. In this embodiment, It may be seen that a conductive resistance sheet is provided at a position similar to the conductive resistance sheet of the door-side vacuum adiabatic body shown in FIG. 4b.

In this case, the second reinforcement member 110 may move to the inside of the refrigerator without contacting the conductive resistance sheet 60 in order not to affect the high thermal conductive adiabatic performance of the conductive resistance sheet 60. This is done for achieving a function of a heat bridge of the conductive resistance sheet. Thus, the conductive resistance sheet 60 and the second reinforcement member 110 do not contact each other so that the conductive adiabatic performance by the conductive resistance sheet and the strength reinforcement performance of the vacuum adiabatic body by the reinforcement member are achieved at the same time.

In this embodiment, it may be applied to the case in which perfect thermal protection and physical protection for the edge portion of the vacuum adiabatic body are required.

Figure 13:
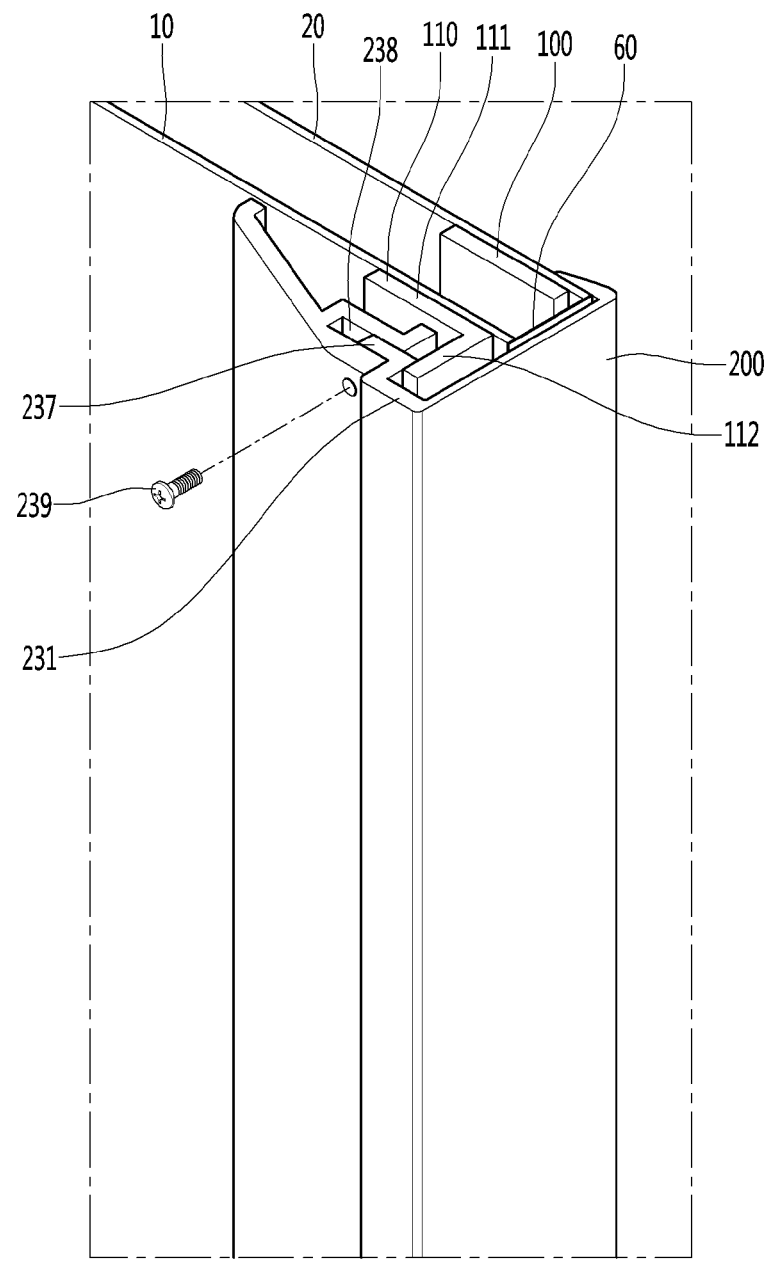
Figure 14:
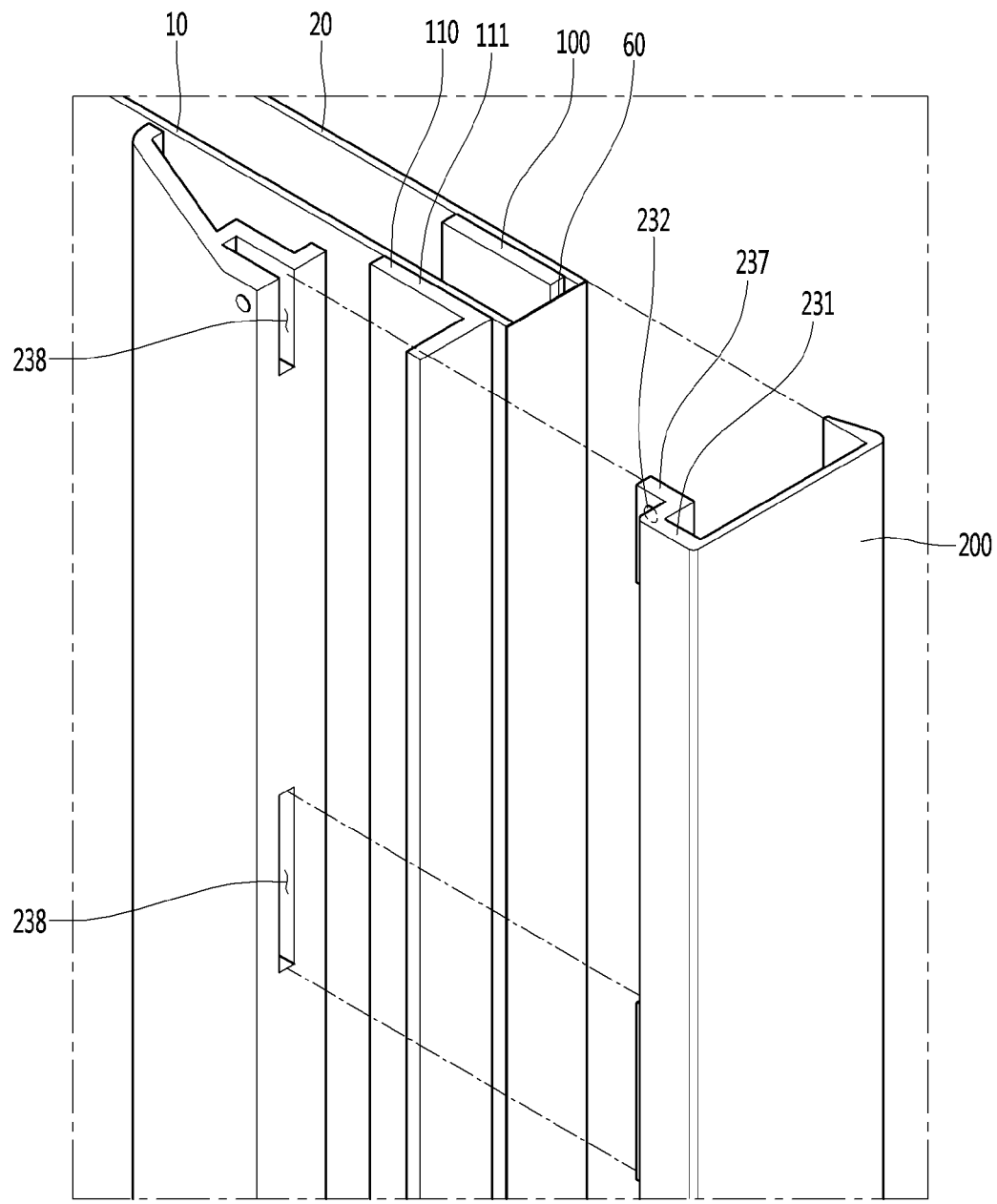

FIGS. 13 and 14 are partial cutaway perspective views illustrating the coupling of the two members in the embodiment in which the inner surface part is divided into two members, wherein FIG. 13 is a state in which the coupling is completed, and FIG. 14 is a view illustrating the coupling process.

Referring to FIGS. 13 and 14, a first member coupling part 232 is hooked with a protrusion part 112 of a second reinforcement member 110, and an outer surface part 210 is supported by a second plate member 20. Thus, a sealing frame 200 may be fixed to an edge portion of the vacuum adiabatic body.

At least one or more first member insertion parts 237 that is bent to extend to the inside of the refrigerator may be provided at end portions of the first member coupling part 232. For example, at least one or more first member insertion parts 237 may be provided for each sealing frame 200 installed in the refrigerator. A second member insertion recess 238 may be provided in a position corresponding to the first member insertion part 237. The first member insertion part 237 and the second member insertion recess 238 may be similar in size and shape to each other. Thus, the first member insertion part 237 may be inserted into the second member insertion recess 238 and then be fitted and fixed.

The coupling of the first member and the second member will be described. In the state in which the first member is coupled to the edge of the vacuum adiabatic body, the second member may be aligned with respect to the first member so that the second member insertion recess 238 corresponds to the first member insertion part 237. When the first member insertion part 237 is inserted into the second member insertion recess 238, the two members may be coupled to each other.

To prevent the coupled second member from being separated from the first member, at least a portion of the second member insertion recess 238 may have a size less than that of the first member insertion part 237. Thus, the two members may be forcibly fitted. To perform an action of being hooked and supported after the second member insertion recess 238 and the first member insertion part 237 are inserted by a predetermined depth, a protrusion and a groove may be respectively provided on/in any point after the predetermined depth. Here, after the two members are inserted at a certain depth, the two members may be inserted further beyond the jaws to allow the two members to be more firmly fixed. Here, the worker may feel that he/she is correctly inserted through the feeling.

The two members constituting the inner surface part may be fixed at the position and the coupling relation by the structure in which the two member are inserted and coupled to each other. Alternatively, when a load is large due to the action of the second member that fixes a separator component, the first member and the second member may be coupled to each other by a separate coupling member such as an inner coupling tool 239.

Figure 15:
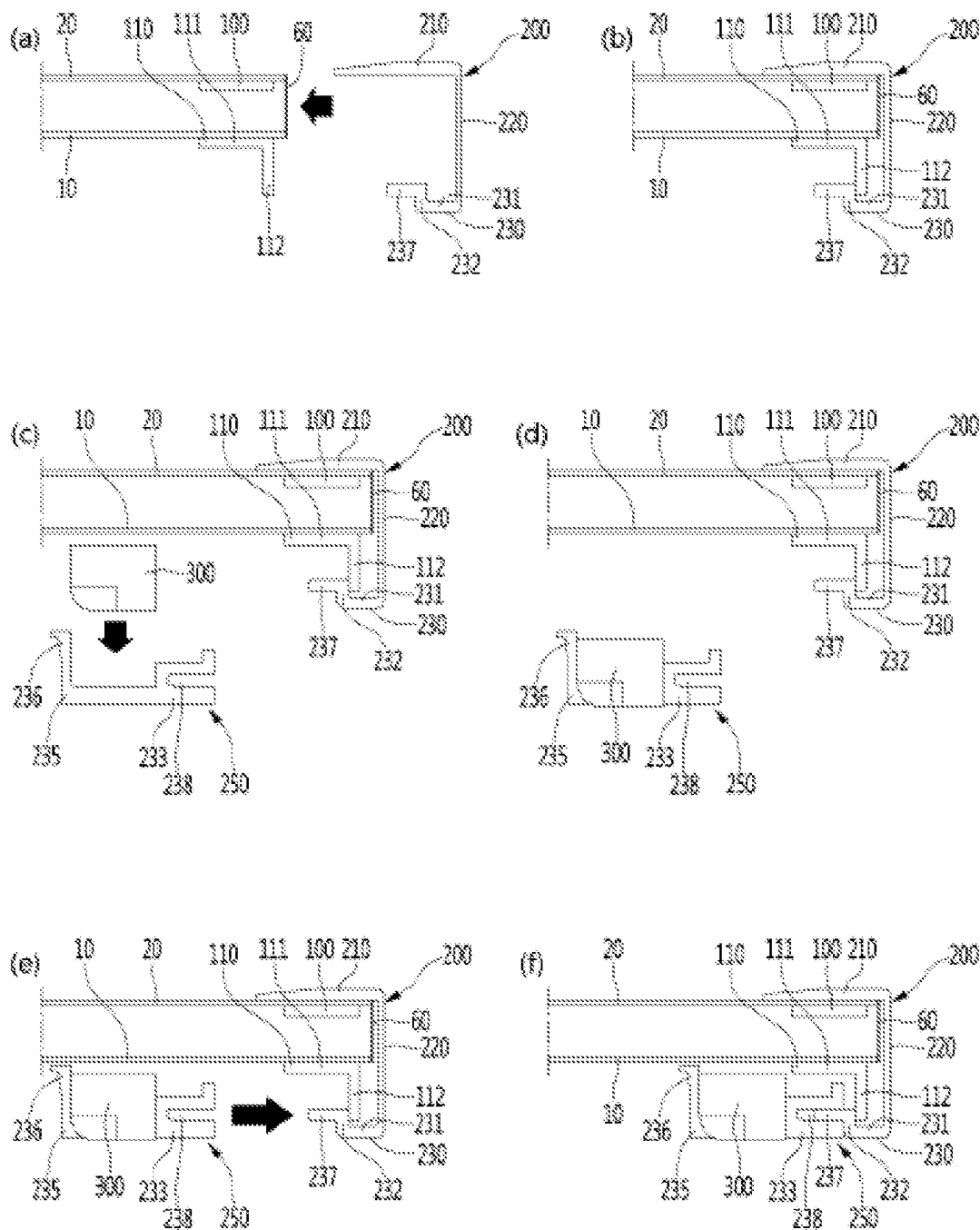
FIG. 15 is a view for sequentially explaining coupling of a sealing frame when the sealing frame is provided as two members according to an embodiment.

FIG. 15 is a view for sequentially explaining coupling of the sealing frame when the sealing frame is provided as two members according to an embodiment. Particularly, a case in which a component is installed on the inner surface part will be described as an example.

Referring to FIG. 15(a), the sealing frame 200 is coupled to the edge portion of the vacuum adiabatic body. Here, the coupling may be performed by using elastic deformation of the sealing frame 200 and restoring force due to the elastic deformation without a separate member such as a screw.

For example, in the state in which the inner surface part 230 is hooked with the second reinforcement member 110, the side surface part 220 and the outer surface part 210 rotate in the direction of the second plate member 20 by using a connection point between the inner surface part 230 and the side surface part 220 as a rotation center. This action may cause elastic deformation of the side surface part 220.

Thereafter, the outer surface part 210 may move inward from the outer surface of the second plate member 20 so that the elastic force of the side surface part 220 acts on the outer surface part 210 and thus lightly coupled. When the coupling of the sealing frame is completed, the sealing frame may be seated in its original position designed in its original shape designed.

Referring to FIG. 15(b), a state in which the first member of the sealing frame 200 is completely coupled is shown. The side surface part 220 may be formed with a thin thickness when compared to that of each of the outer surface part 210 and the inner surface part 230 so that the sealing frame 200 is coupled to the edge of the vacuum adiabatic body by the elastic deformation and the elastic restoring action of the sealing frame.

Referring to FIG. 15(c), a component seating member 250 as a separate component is provided as the second member providing the inner surface part 230. The component seating member 250 may be a component on which the component 399 is placed so that its set position is supported, and an additional function that is necessary for the operation of the component 399 may be further performed. For example, in this embodiment, when the component 399 is the lamp, the gap formation part 234 made of a transparent member may be disposed on the component seating member 250. Thus, light irradiated from the lamp may pass through the inner surface part 230 and be irradiated into the refrigerator, and the user may identify the article in the refrigerator.

The component seating member 250 may have a predetermined shape that is capable of being fitted with the component 399 to fix a position of the component 399.

FIG. 15(d) illustrates a state in which the component 399 is paced on the component seating member 250.

Referring to FIG. 15(e), the component seating member 250 on which the component 399 is seated is aligned in a predetermined direction so as to be coupled to the first member providing the inner surface part. In this embodiment, the first member coupling part 232 and the second member insertion recess 238 may be aligned with each other in the extension direction so that the first member coupling part 232 is inserted into the second member insertion recess 238. Alternatively, although not limited in this way, it may be advantageously proposed to enhance the ease of assembly.

To allow the first member coupling part 232 and the second member insertion recess 238 to be forcibly fitted with respect to each other, the first member coupling part 232 may be slightly larger than the second member insertion recess 238 and have a hook structure such as a protrusion and a projection so as to realize easy insertion.

Referring to FIG. 15(f), the inner surface part in a completely assembled state is illustrated.

Figure 16:
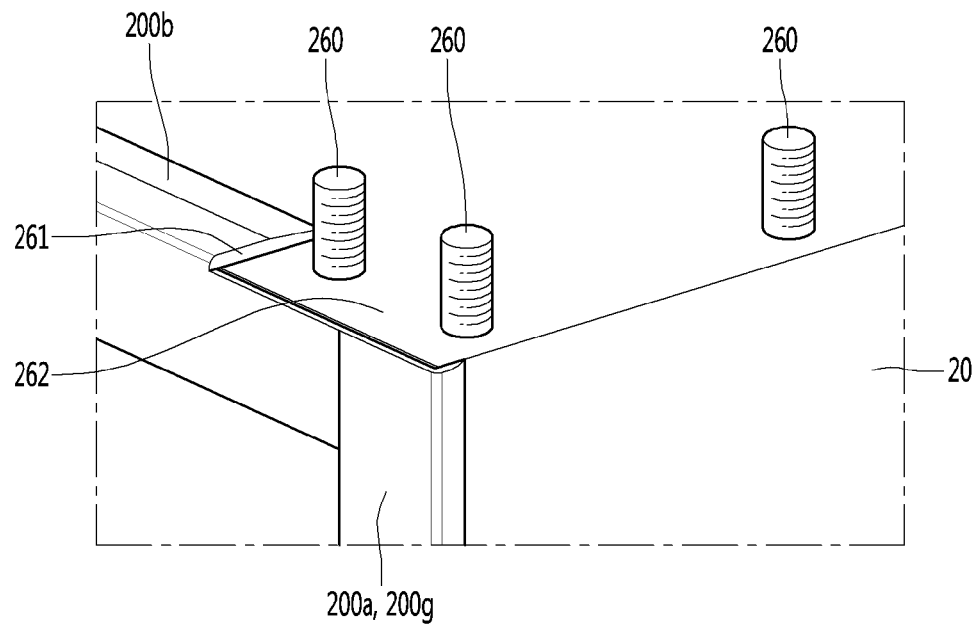
Figure 17:
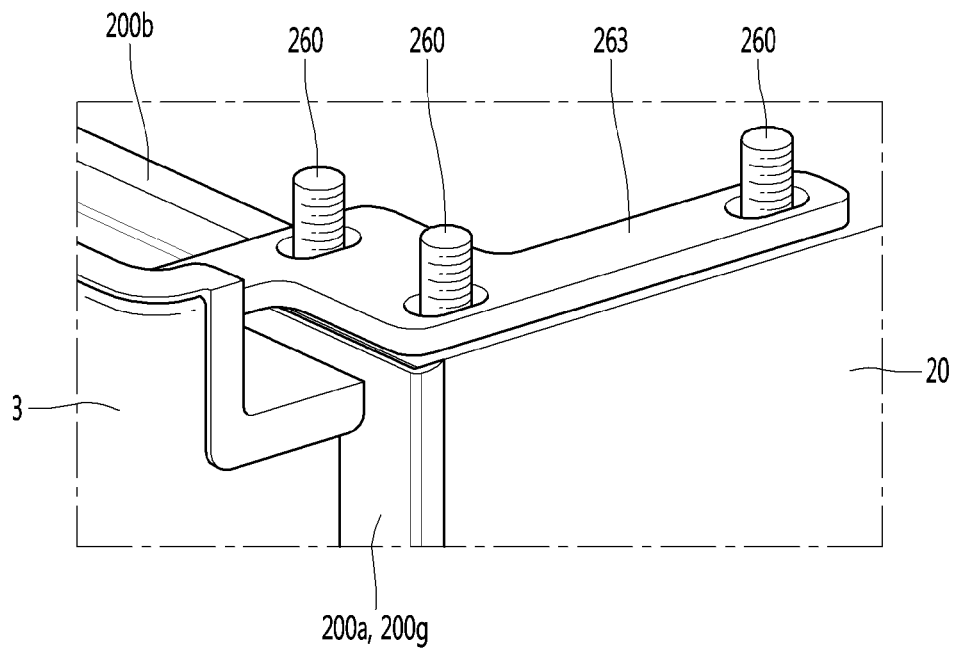

FIGS. 16 and 17 are views illustrating one end portion of the sealing frame, wherein FIG. 16 illustrates a state before a door hinge is installed, and FIG. 17 illustrates a state in which the door hinge is installed.

In the case of the refrigerator, a door hinge is provided at the connection part so that the door-side vacuum adiabatic body is rotatably coupled to the main body-side adiabatic body. The door hinge has to have predetermined strength and also be capable of preventing drooping of the door due to its own weight in a state in which the door is coupled and preventing the main body from being twisted.

Referring to FIG. 16, to couple the door hinge 263, a door coupling tool 260 is provided on the main body-side vacuum adiabatic body. The door coupling tool 260 may be provided in three. The door coupling tool 260 may be directly or indirectly fixed to the second plate member 20 and/or the reinforcement members 100 and 110 and/or a separate additional reinforcement member (for example, an additional plate further provided on the outer surface of the second plate member). Here, the expression 'direct' may be referred to as a fusing method such as welding, and the expression 'indirect' may refer to a coupling method using an auxiliary coupling tool or the like instead of the fusion or the like.

Since the door coupling tool 260 requires high supporting strength, the door coupling tool 260 may be coupled to the second plate member 20. For this, the sealing frame 200 may be cut, and the sealing frame 200 to be cut may be the upper sealing frame 200b at an upper edge of the main body-side vacuum adiabatic body. Also, the sealing frame 200 may include right sealing frames 200a, 200f, and 200g on a right edge of the main body-side vacuum adiabatic body, and a lower side sealing frame 200e on a lower edge of the main body-side vacuum adiabatic body. If the door installation direction is different, the left sealing frames 200a, 200f, and 200g at the left edge of the body-side vacuum adiabatic body may be used.

The sealing frame 200 to be cut may have a cutoff surface 261, and the second plate member 20 may have a door coupling tool seating surface 262 to which the door coupling tool 260 is coupled. Thus, the sealing frame 220 may be cut to be exposed to the outside of the door coupling tool seating surface 262, and an additional plate member may be further inserted into the door coupling tool seating surface 262.

As described in the drawings, the end portion of the sealing frame 200 may not be entirely removed, but a portion of the sealing frame 200 may be removed only at a portion at which the door coupling tool 260 is provided. However, it may be more preferable that all the end portions of the sealing frame 200 are removed to facilitate the manufacture and to allow the door hinge 263 to contact the vacuum adiabatic body so as to be firmly coupled to the vacuum adiabatic body.

Figure 18:
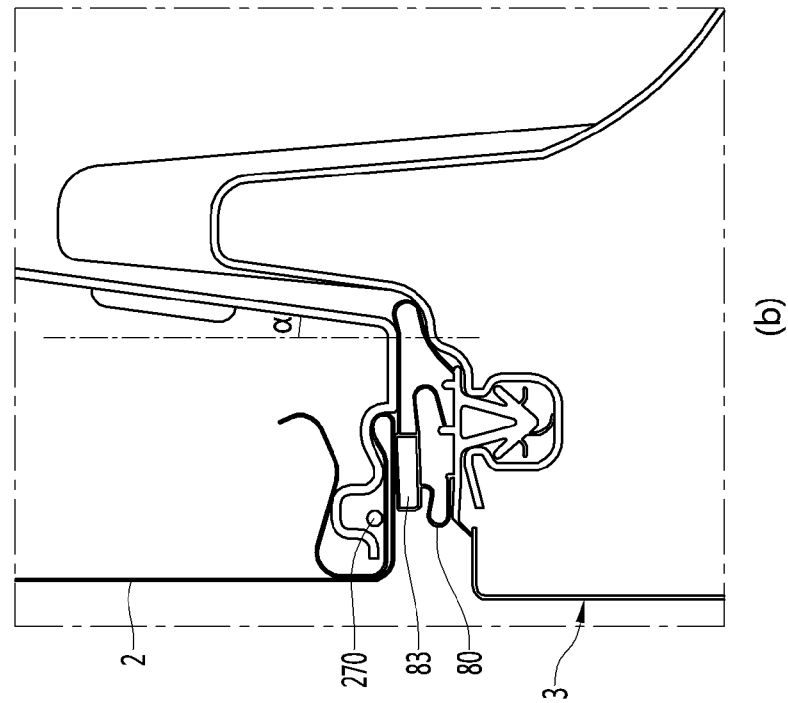
Figure 18:
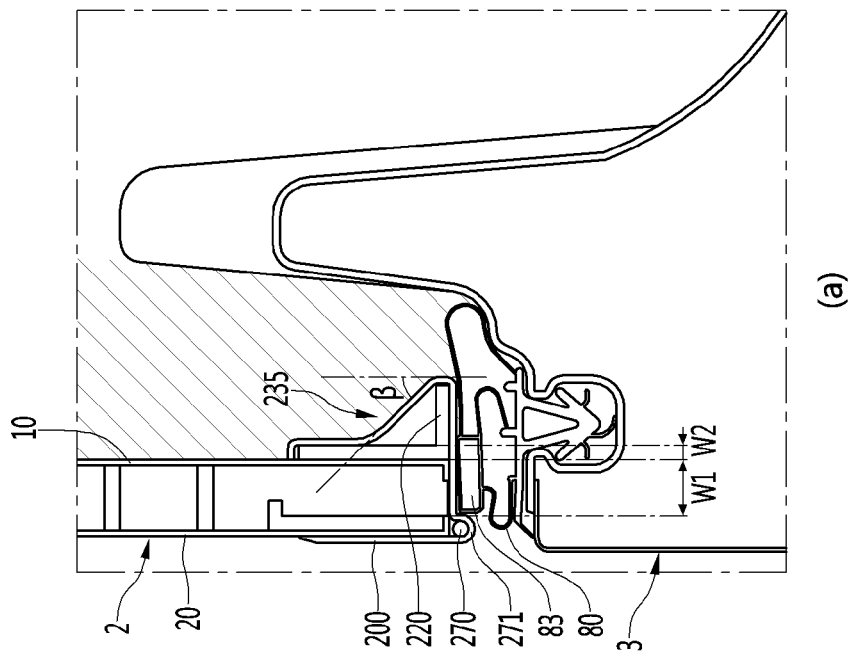

FIG. 18 is a view for explaining an effect of the sealing frame according to an embodiment in comparison with the technique according to the related art, wherein FIG. 18(a) is a cross-sectional view of the contact part of the main body-side vacuum adiabatic body and the door according to an embodiment, and FIG. 18(b) is a cross-sectional view of the main body and the door according to the related art.

Referring to FIG. 18, in the refrigerator, a hot line may be provided at the contact portion between the door and the main body to prevent dew formation due to sharp temperature change. As the hot line is closer to the outer surface and the edge of the main body, the dew condensation may be removed even with small heat capacity.

According to an embodiment, the hot line 270 may be disposed in an internal space of a gap between the second plate member 20 and the sealing frame 200. A hot line accommodation part 271 in which the hot line 270 is disposed may be further provided in the sealing frame 200. Since the hot line 270 is placed outside the conductive resistance sheet 60, an amount of heat transferred to the inside of the refrigerator is small. Thus, the dew condensation on the main body and the door contact part may be prevented by using smaller heat capacity. In addition, the hot line 270 may be disposed on a relative outside of the refrigerator, i.e., a bent portion between the edge of the main body and the outer surface of the main body to prevent heat from being introduced into the internal space of the refrigerator.

In this embodiment, the side surface part 220 of the sealing frame 200 may have a portion w1 that is aligned with the gasket 80 and the vacuum space part 50 and a portion w2 that is not aligned with the vacuum space part 50 but aligned with the gasket 80 and the internal space of the refrigerator. This is a portion provided by the side surface part 220 to ensure sufficient cold air interruption by the magnet. Thus, the sealing effect by the gasket 80 may be sufficiently achieved by the sealing frame 200.

In this embodiment, the inward inclined part 235 is provided to be inclined toward the inner surface of the first plate member 10 at a predetermined angle β. This makes it possible to give the effect in which the capacity within the refrigerator increases so that the narrow space within the refrigerator is more widely used. That is to say, like the related art, the inward inclined part may be inclined to a direction opposite to the predetermined angle β toward the internal space of the refrigerator to widely utilize a space that is close to the door. For example, more foods may be accommodated in the door, and more space for accommodating various components that are necessary for operation of the device may be defined.

Hereinafter, various embodiments in which the sealing frame 200 is installed will be described with reference to FIGS. 19 to 24.

Figure 19:
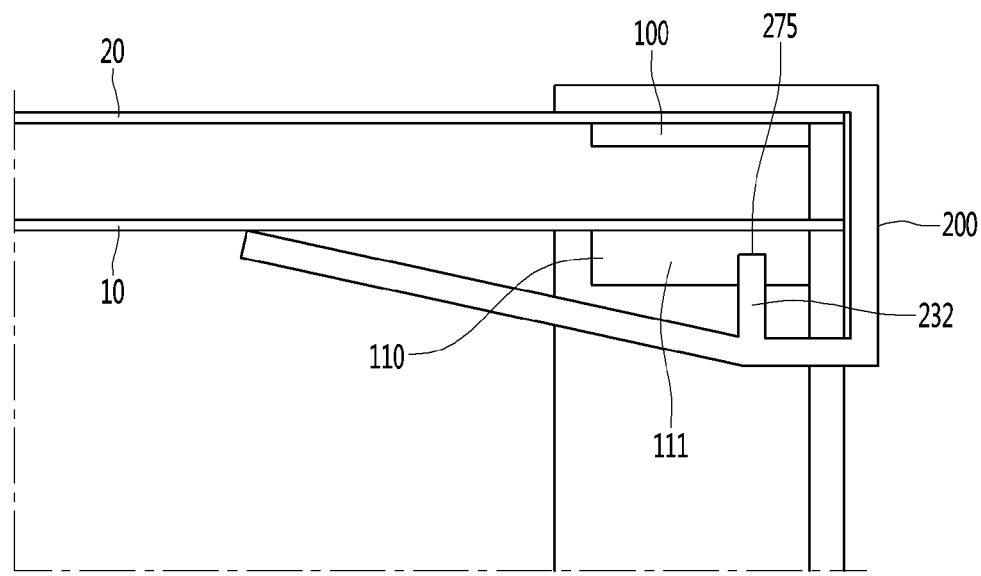
FIGS. 19 to 24 are views illustrating various embodiments in which the sealing frame is installed.

Referring to FIG. 19, the second reinforcement member 110 may include only a base part 111 but do not include a protrusion part 112. In this case, a groove 275 may be provided in the base part 111. An end portion of the first member coupling part 232 may be inserted into the groove 275. In this embodiment, it may be applied in a case of an article which provides sufficient strength without providing the protrusion part 112 on the second reinforcement member 110.

In this embodiment, the sealing frame 200 may be coupled to the end portion of the vacuum adiabatic body by aligning the first member coupling part 232 to be inserted into the groove 275 when the sealing frame 200 is coupled.

According to the coupling action of the groove 275 and the first member coupling part 232, the movement of the sealing frame 200 in the y-axis direction may be stopped through only the coupling of the inner surface part 230 of the sealing frame 200 and the second reinforcement part 110.

Figure 20:
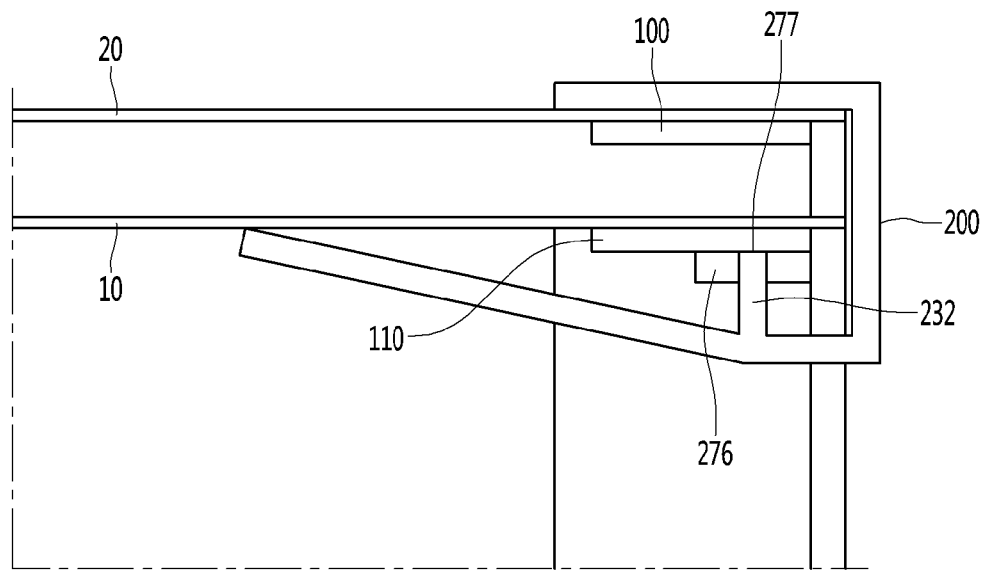

Referring to FIG. 20, the this embodiment is different from the above-described embodiment of FIG. 19 except that the base part 111 is further provided with a reinforcement base part 276. A groove 277 may be further provided in the reinforcement base part 276 so that an end portion of the first member coupling part 232 is inserted. In this embodiment, even though the second reinforcement member 110 is not provided with the protrusion part 112 because of an insufficient space or interference with the installation space, it may be applied when it is necessary to reinforce the strength to a predetermined level. That is to say, it may be applied when the strength reinforcement of the main body-side vacuum adiabatic body is provided at a level of strength reinforcement which is obtained by further providing a reinforcement base 276 at the outer end of the base part 111.

A groove 277 is provided in the reinforcement base part 276, and an end portion of the first member coupling part 232 is inserted into the groove part 277 to align the sealing frame 200 with the vacuum adiabatic body. Thus, the sealing frame 200 may be coupled to the end portion of the vacuum adiabatic body.

According to the coupling action of the groove 277 and the first member coupling part 232, the movement of the sealing frame 200 in the y-axis direction may be stopped through only the coupling of the inner surface part 230 of the sealing frame 200 and the second reinforcement part 110.

Figure 21:
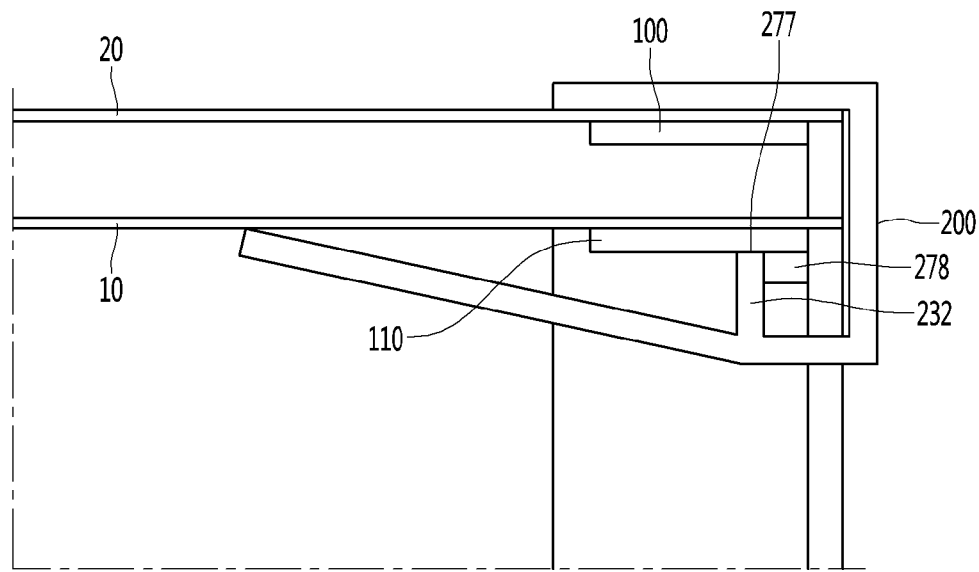

Referring to FIG. 21, the this embodiment is different from the above-described embodiment of FIG. 19 except that the base part 111 is further provided with a reinforcement protrusion 278. The end portion of the first member coupling part 232 may be hooked on the reinforcement protrusion 278. In this embodiment, even though the second reinforcement member 110 is not provided with the protrusion part 112 or the reinforcement base part 276 because of an insufficient space or interference with the installation space, it may be applied when it is necessary to reinforce the strength to a predetermined level and to allow the first member coupling part 232 to be hooked. That is to say, the reinforcement protrusion 278 may be further disposed on an outer end portion of the base part 111 to obtain a strength reinforcement effect of the main body-side vacuum adiabatic body. Also, the reinforcement protrusion 278 may be applied because it provides a hook action of the first member coupling part 232.

The first member coupling part 232 may be hooked to be supported by the reinforcement protrusion 278 so that the sealing frame 200 is coupled to the end portion of the vacuum adiabatic body.

The embodiment proposed in FIGS. 19 to 21 illustrates a case in which the inner surface part 230 is not dived into the first member and the second member but is provided as a single product to be coupled to the vacuum adiabatic body. However, this embodiment is not limited thereto. For example, the sealing frame 200 may be divided into the two members.

Although the second reinforcement member 110 is provided in the above embodiment, a case in which the sealing frame 200 is coupled when a separate reinforcement member is not provided inside the first plate member 10 will be described in the following embodiment.

Figure 22:
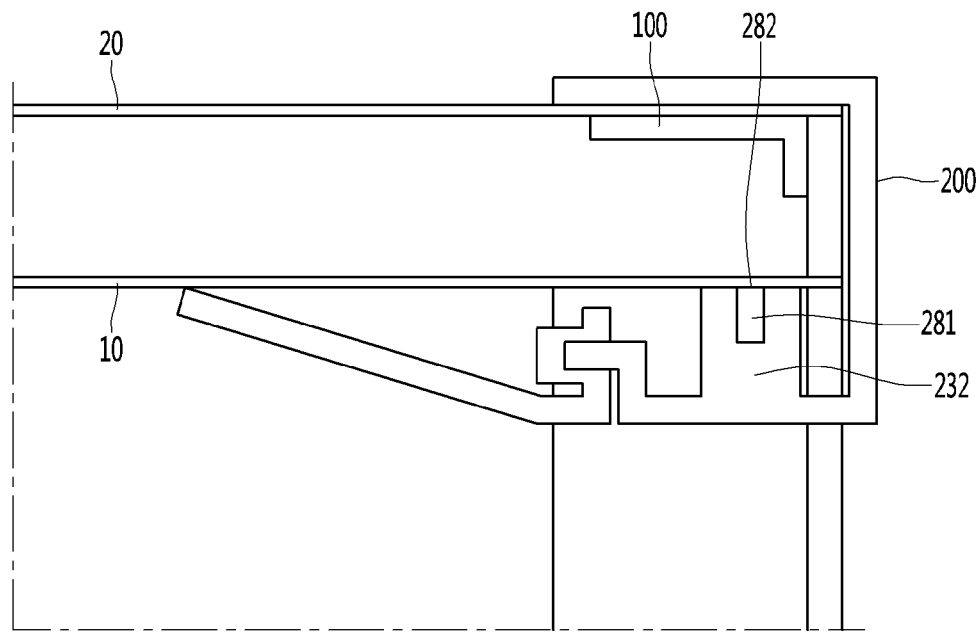

Referring to FIG. 22, although the first reinforcement member 100 is provided to reinforce the strength of the vacuum adiabatic body, the second reinforcement member 110 is not provided separately. In this case, an inner protrusion 281 may be provided on the inner surface of the first plate member 10 so that the sealing frame 200 is coupled. The inner protrusion 281 may be coupled to the first plate member 10 by welding or fitting. This embodiment may be applied to a case in which the sufficient strength of the main body-side vacuum adiabatic body is obtained only by the reinforcement member provided in the first reinforcement member 100, that is, the inside of the vacuum space part 50, and the reinforcement member is installed on a side of the second plate member 20.

The first member coupling groove 282 may be provided in the first member coupling part 232 so as to be inserted and fixed to the inner protrusion 281. The inner protrusion 281 may be inserted into the first member coupling groove 282 so that a coupled position of the sealing frame 200 is fixed.

Figure 23:
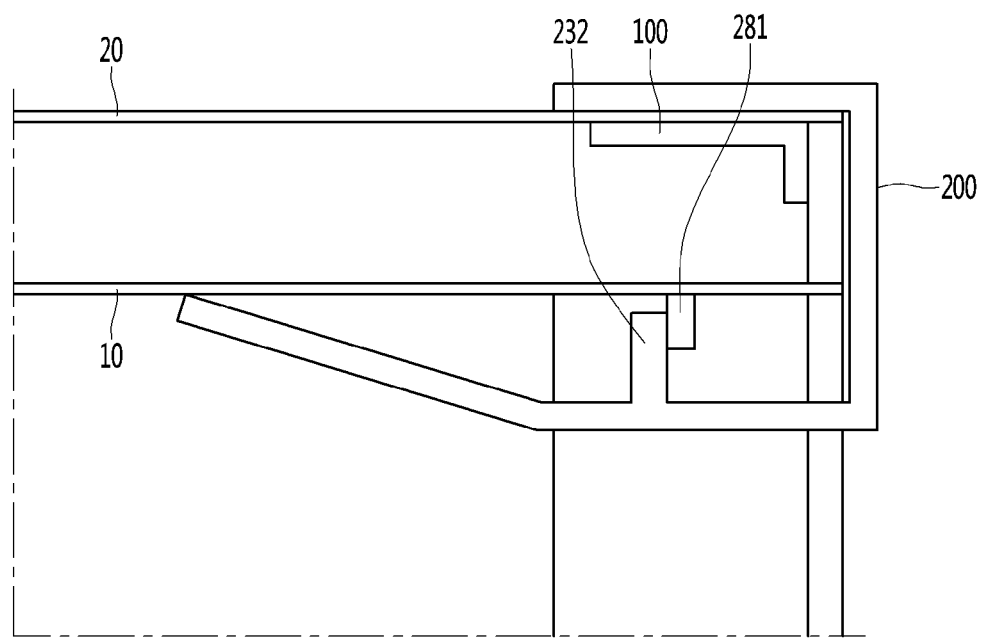

Referring to FIG. 23, it is characteristically different that the first member coupling groove 282 is not provided as compared with the embodiment shown in FIG. 22. According to this embodiment, one end of the first member coupling part 232 may be supported by the inner protrusion 281 so that the position of the sealing frame 200 is supported.

When compared to the embodiment proposed in FIG. 22, this embodiment may have a disadvantage in that the movement of the sealing frame 200 is stopped in only one direction, instead that the movement of the sealing frame 200 in the y-axis direction is stopped by the inner protrusion 281 and the first member coupling groove 282 in both directions. However, an advantage that the worker conveniently works when the sealing frame 200 is coupled may be expected.

In the embodiment proposed in FIGS. 19 to 23, a side of the first plate member 10 is fixed, and a side of the second plate member 20 is provided with a constituent in which the movement such as sliding or the like is allowed. That is to say, the second plate member 20 and the outer surface part 210 are allowed to be relatively slidable, and relative movement of the first plate member 10 and the inner surface part 230 is not allowed. Such the constituent may be configured opposite to each other. Hereinafter, such the constituent will be proposed.

Figure 24:
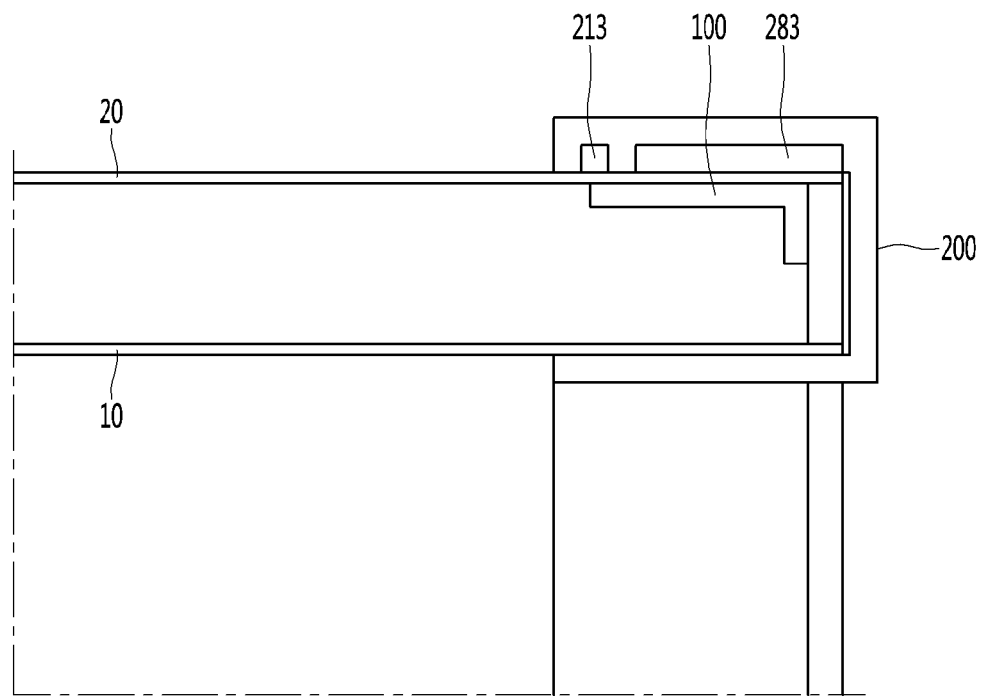

Referring to FIG. 24, an outer protrusion 283 may be provided on the outer surface of the second plate member 20, and an outer hook part 213 may be provided on the outer surface 210 of the sealing frame 200. The outer hook part 213 may be hooked to be supported by the outer protrusion 283.

In case of this embodiment, the inner surface part 230 of the sealing frame 200 may be allowed to move with respect to the inner surface part of the first plate member 10 such as the sliding or the like. In this embodiment, mounting and fixing of the sealing frame 200 are different only in the direction, and the same description may be applied.

Various embodiments may be further proposed in addition to the embodiment related to FIG. 24. For example, the reinforcement member 100 and 110 may be further provided on the second plate member 20, and various structures of FIGS. 19 to 21 may be provided for the reinforcement member. Also, the outer hook part 213 may be provided as a groove structure as shown in FIG. 22.

According to this embodiment, there is a difference in configuration such that the coupling direction of the sealing frame 200 is provided in the opposite direction of the original embodiment. However, the fundamental function of the sealing frame may be obtained in the same way.

Hereinafter, an embodiment in which the adiabatic loss through the edge portion of the vacuum adiabatic body, that is, the adiabatic loss due to the leakage of cold air through the narrow gap of the plate member at the edge of the vacuum adiabatic body is improved is disclosed. Also, a refrigerator to which the vacuum adiabatic body is applied will be described. The description of the embodiments below may be applied to the ideas disclosed in the previous embodiments. Therefore, even if there is no specific mention, the technical ideas of the other previous embodiments may be applied to the following embodiments within the allowable range.

Figure 25:
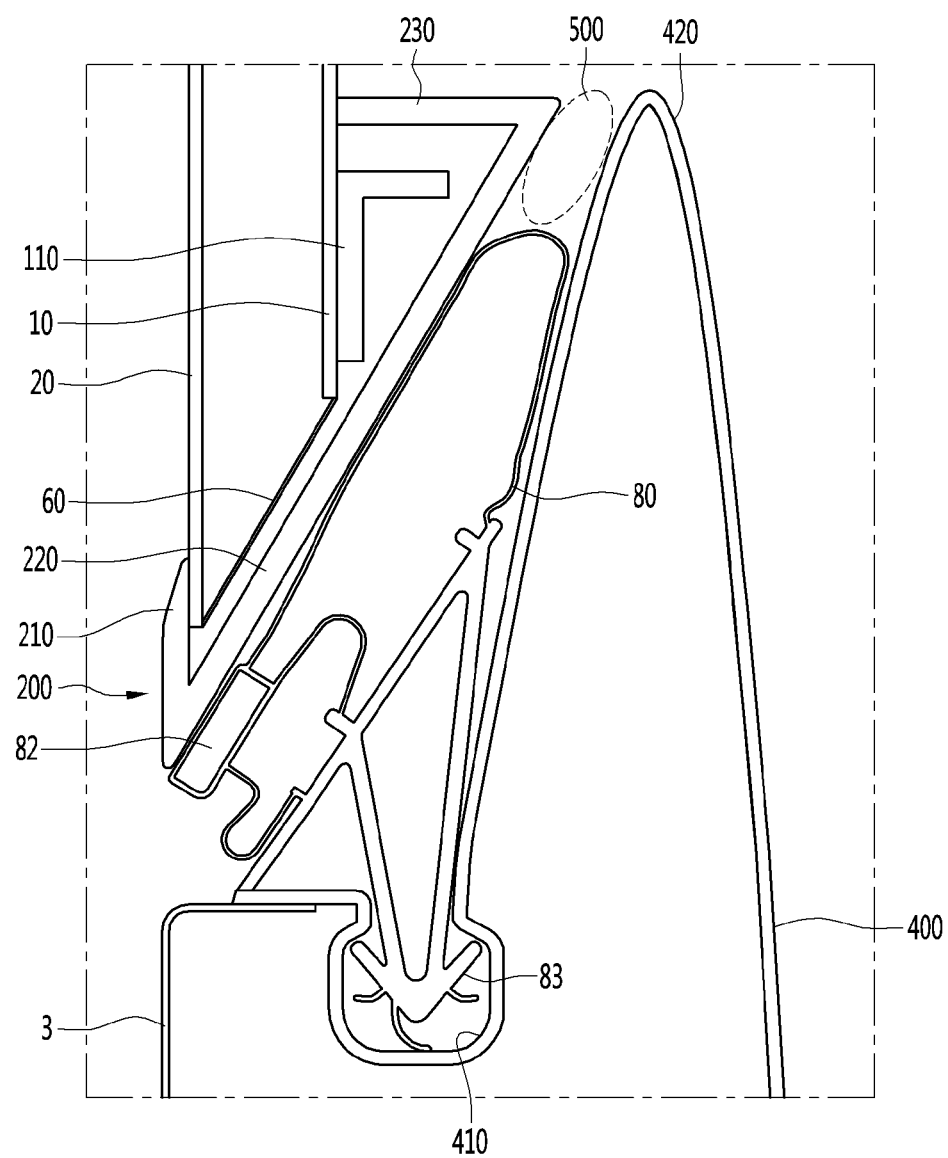
FIG. 25 is an enlarged cross-sectional view illustrating a contact part between a door and a main body of the refrigerator as an edge portion of a vacuum adiabatic body according to an embodiment.

FIG. 25 is an enlarged cross-sectional view illustrating a contact part between a door and a main body of the refrigerator as an edge portion of a vacuum adiabatic body according to an embodiment.

Referring to FIG. 25, a first plate member 10, a second plate member 20, and a conductive resistance sheet 60 are provided. The conductive resistance sheet 60 may be provided as a thin plate to resist to thermal conduction between the plate members 10 and 20. Although the conductive resistance sheet 60 is provided as a flat plan shape as a thin plate, the conductive resistance sheet 60 may have a curved shape by being pulled inward when vacuum is applied to the vacuum space part 50.

The conductive resistance sheet 60 is provided at an angle different from that of the previous embodiment. In detail, when the plate members 10 and 20 are viewed horizontally, the plate members 10 and 20 are inclined at an angle other than a predetermined angle. That is to say, a virtual line connecting both ends of the conductive resistance sheet to each other with respect to the cross-section may be set at an arbitrary angle, not perpendicular to the extension direction of the plate member. In other words, a virtual line having the shortest distance, which connects end portions of the first plate member to the second plate member is set so that at least one extension direction of the first plate member or the second plate member is obliquely inclined when viewed in a horizontal direction. Thus, the length of the virtual line connecting the end portions of the plate members 10 and 20 is longer than the width of the vacuum space part. In addition, the length of the side surface part of the sealing frame 200 and the length of the gasket 80, which will be described below, are longer than the width of the vacuum space part.

According to an embodiment, it may be provided inwardly, that is, inclined to the inside of the refrigerator, at an acute angle inward from the outside of the vacuum adiabatic body. That is, the end portion of the first plate member disposed inside the refrigerator is positioned inside the end portion of the second plate member outside the refrigerator.

According to the configuration of the conductive resistance sheet 60 described above, the length of the conductive resistance sheet 60 connecting the plate members 10 and 20 to each other becomes long, and an amount of conductive heat transmitted through the conductive resistance sheet 60 is further reduced.

Since the conductive resistance sheet 60 has the thin plate shape and low strength, the conductive resistance sheet 60 may be damaged by even an external small impact. As a result, when the conductive resistance sheet 60 is damaged, the vacuum of the vacuum space part may be broken, and thus, performance of the vacuum adiabatic body may not be properly exerted. To solve this limitation, a sealing frame 200 may be disposed to be inclined to the inside of the refrigerator on an outer surface of the conductive resistance sheet 60. According to the sealing frame 200, components of the door 3 or other components may not directly contact the conductive resistance sheet 60 but indirectly contact the conductive resistance sheet 60 through the sealing frame 200 to prevent the conductive resistance sheet 60 from being damaged. To allow the sealing frame 200 to prevent an impact from being applied to the conductive resistance sheet 60, the two members may be spaced apart from each other, and a buffer member may be interposed between the two members.

To reinforce the strength of the vacuum adiabatic body, a reinforcement member may be provided on each of the plate members 10 and 20. For example, the reinforcement member may include a reinforcement member 110 coupled to an edge portion of the first plate member 10. To improve the strength of the vacuum adiabatic body, a member having a thickness and strength greater than those of the plate member 10 may be applied to the reinforcement member 100.

The reinforcement member may be installed with respect to the second plate member as described in the foregoing embodiment.

The sealing frame 200 may include an inner surface part 230 disposed in the internal space of the main body 2 and supported by the first plate member 10, an outer surface part 210 disposed in the external space of the main body 2 and supported by the second plate member 20, and a side surface part 220 disposed on a side surface of the edge of the vacuum adiabatic body constituting the main body 2 to cover the conductive resistance sheet 60 and connect the inner surface part 230 to the outer surface part 210.

The side surface part 220 may be inclined inward in the extension direction of the conductive resistance sheet 60. An installation angle may also be inclined like the conductive resistance sheet 60. Thus, a protection action with respect to the conductive resistance sheet 60 may be sufficiently achieved.

The sealing frame 200 provides a first plate member 10 for providing a vacuum space and a cover member for an adiabatic space covering an end portion of the second plate member 20. At least a portion of the side surface part 220 of the sealing frame 200 has a first extension part on which the gasket 80 is seated when the door is closed.

The energy nose 500 may be provided in a gap part between the side surface part 220 of the sealing frame 200 and the door 3 and more specifically the door liner 400. A portion of the sealing frame 200 providing the energy nose may be called a second extension part. The first extension part and the second extension part may be continuously connected to each other. Thus, an adiabatic effect of the energy nose may be improved.

The sealing frame 200 may be made of a resin material that is slightly deformable. A mounted position of the sealing frame 200 may be maintained by an interaction between the inner surface part 230 and the outer surface part 210, i.e., by a holding action. That is to say, the set position may not be separated.

A door liner 400 may be provided on the door 3. The door liner 400 is elongated toward the inside of the refrigerator when viewed in cross-section. The extension length of the door liner 400 may be extended to the length of the side surface part 220 of the sealing frame 200. That is to say, a door liner protrusion 420 may be disposed to extend to the side surface part 220 of the sealing frame 200. A gap part between the side surface portion 220 and the door liner protrusion 420 forms an energy nose to further reduce heat loss.

A gasket 80 may be installed on the door liner 400. The gasket 80 may be provided so that the length of the conductive resistance sheet 60 becomes longer and longer. The gasket 80 can be fastened by inserting a gasket fastening member or tool 83 into a door liner fastening groove 410 provided in the door liner 400. The gasket 80 is provided with a magnet 82 so that the gap between the door 3 and the main body 2 is sealed by force that the magnet 82 approaches the door.

The gasket 80 is disposed between the main body of the refrigerator and the door to prevent the cold air from leaking between the door and the main body when the door is closed. The gasket 80 is inclined inward to allow the door to be compressed and deformed to be sealed between the door and the main body when the door is closed.

The gasket may have a body part including a gasket coupling tool 83 and a wing part provided in a thin plate shape and allowed to be deformed so that the gasket is compressed and deformed. The gasket 80 may be made of a highly elastic material so that the body and the wing are formed, and the wing is deformed. A resin such as PVC may be used as the material of the gasket 80.

Table 1 shows the thermal conductivity of each component and material applied to the refrigerator.

TABLE 1

| Material | Thermal Conductivity (W/mK) |
| --- | --- |
| Polyurethane foam | 0.026 |
| VIP | 0.0032 |
| Al | 202 |
| Gasket | 5 |
| Steel | 14.9 |
| ABS | 0.19 |
| Rubber magnet | 10 |
| Air | 0.024 |
| Vacuum adiabatic body | 0.002 |

Referring to Table 1, polyurethane foam according to the related art has thermal conductivity as high as 13 times as compared with a vacuum adiabatic body, of which the inside is maintained in a vacuum state, according to an embodiment. A vacuum insulation plate (VIP) in which a porous material is accommodated therein has thermal conductivity as high as about 25% as compared with the vacuum adiabatic body. The PVC has thermal conductivity of about 0.16, similar to ABS. As a result, the thermal conductivity gradually increases in order of the vacuum adiabatic body, the polyurethane foam, and the PVC. A thickness of each member corresponding to the thermal conductivity of each member will be described. First, the thickness of the vacuum adiabatic body may be about 10 mm to about 20 mm to secure a wide internal space of the refrigerator. When the polyurethane foam is applied to secure the same degree of adiabatic performance, a thickness of about 40 mm to about 50 mm or more may be applied. In case of the gasket 80, it is difficult to secure sufficient adiabatic performance with a thickness similar to that of the vacuum adiabatic body. For this reason, the gasket 80 may be applied with a width of about 20 mm to about 30 mm or more.

Sufficient adiabatic performance may be secured only when a width of a surface of the gasket 80, which contact the sealing frame 200 is greater than the width of the vacuum adiabatic body.

To secure the sufficient adiabatic performance, a maximum value of a length of the gasket in the horizontal direction that is parallel to the surface on which the gasket 80 is seated on the sealing frame 200 may be greater than a gap between the first plate member 10 and the second plate member 20, which define the third space.

A maximum value of a length of the sealing frame in the horizontal direction that is parallel to the surface on which the gasket 80 is seated on the sealing frame may be greater than a gap between the first plate member 10 and the second plate member 20, which define the third space.

Specific operations of this embodiment will be described with reference to the respective drawings.

Figure 26:
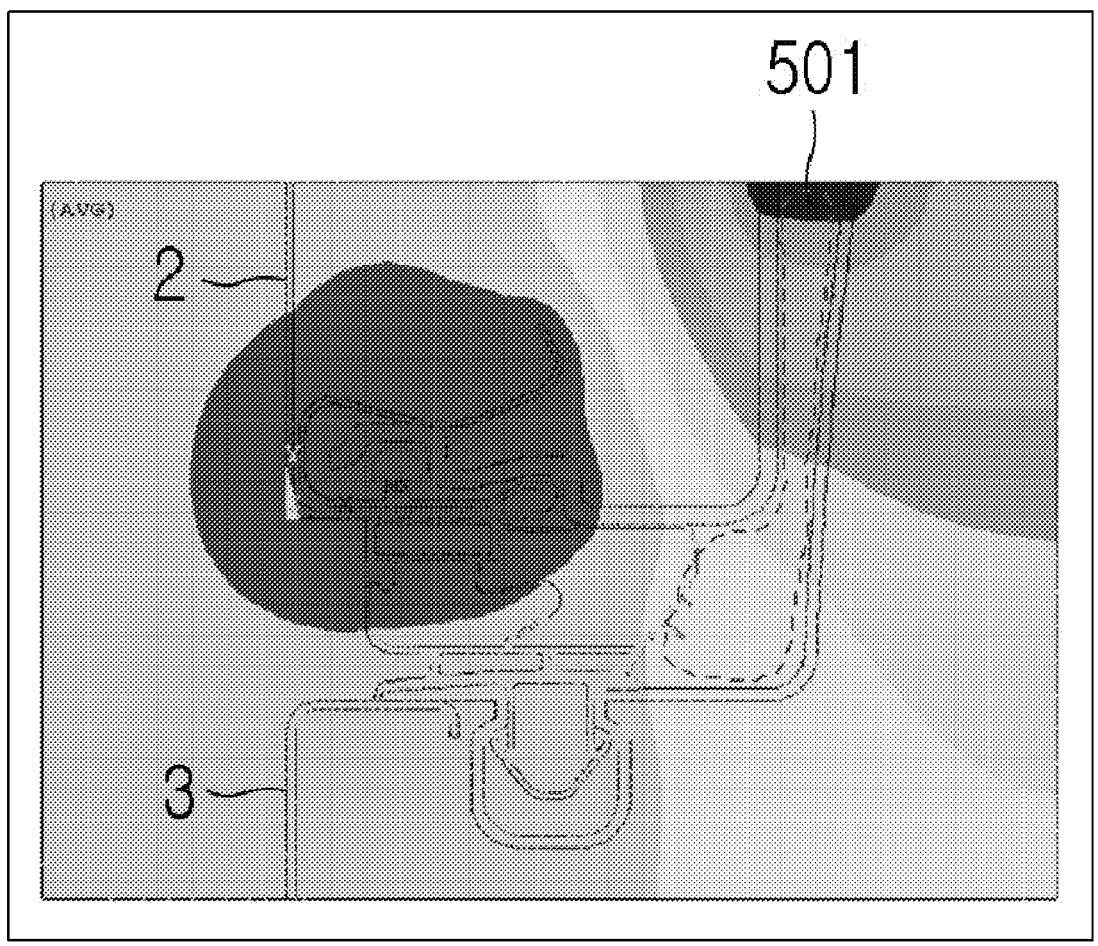
FIG. 26 is a conceptual view of an energy nose in the refrigerator.
Figure 27:
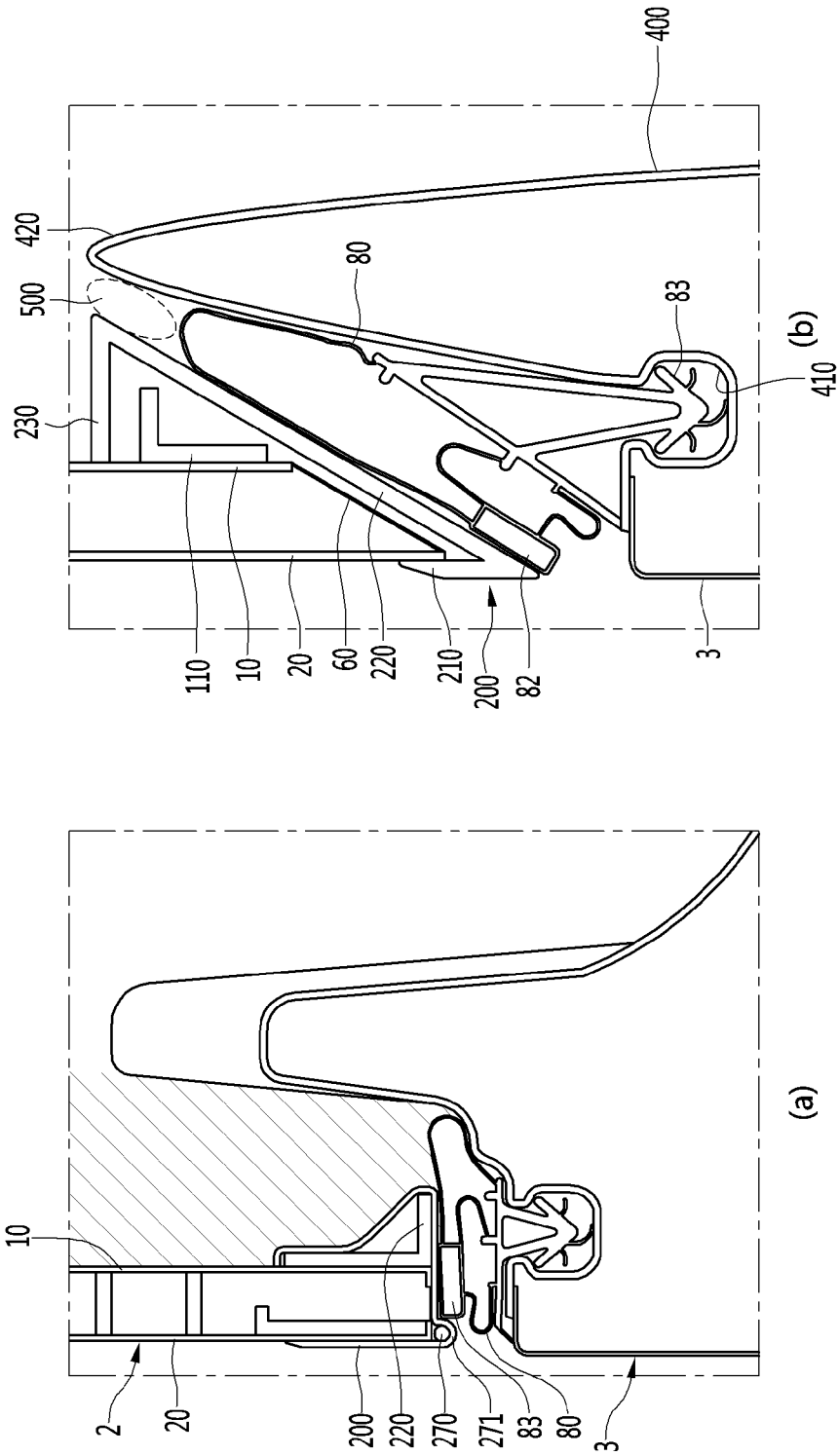
FIG. 27 is a view for comparing the energy noses of a general conductive resistance sheet and an inclined conductive resistance sheet.

First, FIG. 26 is a conceptual view of an energy nose in the refrigerator, and FIG. 27 is a view for comparing the energy noses of a general conductive resistance sheet and an inclined conductive resistance sheet.

In FIG. 26, a red color indicates a relatively high temperature, and a blue color indicates a relatively low temperature. Firstly, the leakage of cold air is blocked by the gasket in a space between the door and the main body. Furthermore, it is seen that the temperature suddenly changes even in a narrow gap part toward the inside of the gasket. This narrow region may be called an energy nose 501. The energy nose is a zone in which convection heat transfer is blocked because the forced air flow in the refrigerator is blocked by the narrow gap.

In foregoing another embodiment shown in FIG. 27(*a*), it is seen that the space of the gasket 80, which faces the inside of the refrigerator, is difficult to provide the energy nose. On the other hand, in this embodiment shown in FIG. 27(*b*), it is seen that the energy nose 500 is provided in the space of the gasket 80, which faces the inside of the refrigerator. Thus, it is also possible to provide the energy nose even in the refrigerator to which the vacuum adiabatic body is applied, thereby ensuring high adiabatic performance for the refrigerator.

Referring again to FIG. 25, the conductive resistance sheet 60 is provided to be inclined. The conductive resistance sheet is coupled to the plate member through welding.

When the conductive resistance sheet is inclined at an angle with respect to the plate member, it is difficult to secure adhesion between the conductive resistance sheet and the plate member during the welding. The present inventor has taken note of the fact that the conductive resistance sheet 60 is performed before the welding to solve this limitation. The welding of the conductive resistance sheet and the plate member will be described in detail with reference to the drawings.

Figure 28:
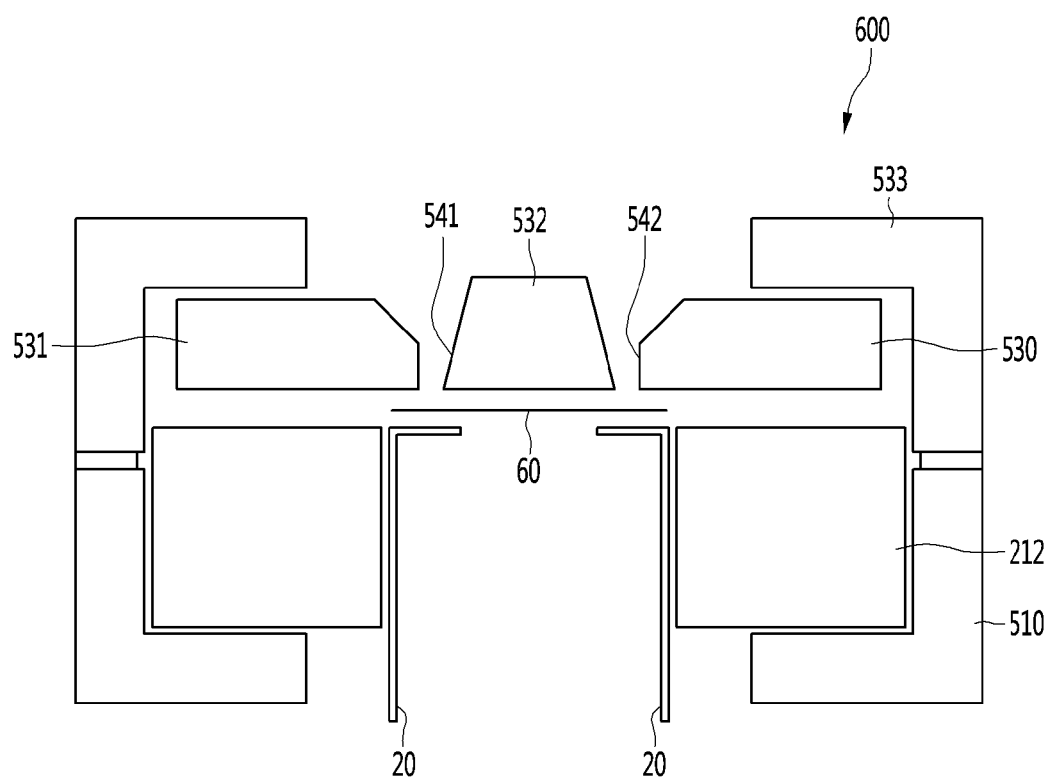
FIG. 28 is a view for explaining a welding device that welds a conductive resistance sheet to a plate member according to a related art.

FIG. 28 is a view for explaining a welding device that welds a conductive resistance sheet to a plate member according to a related art.

Referring to FIG. 28, in a welding apparatus 600, a plurality of jigs are placed inside the casing 510 which is divided into upper and lower parts and left and right parts. A pair of lower jig 520 and upper jig 530 are placed in the jig, and a conductive resistance sheet 60 is placed in a gap between the upper jig 530 and the lower jig 520.

The upper side jig 530 includes an outer upper jig 531, a center upper jig 532, and an inner upper side jig 533. The gap part between the outer upper jig 531 and the center upper jig 532 and the gap part between the center upper jig 532 and the inner upper jig 533 are opened so that laser is introduced.

When explaining a welding process, first, in the welding apparatus, a first plate member 10 and a second plate member 20 are disposed close to inner surfaces of the pair of lower jigs 520. A conductive resistance sheet 60 is disposed between the plate member and the upper jig. The laser is irradiated to the gap part between the upper jig to weld and fix the conductive resistance sheet 60 and the plate members 10 and 20 to each other. Here, a negative pressure environment is formed in the inner space of the lower jig 520 so that the conductive resistance sheet 60 and the plate members 10 and 20 are more closely attached to each other.

As described above, the horizontal conductive resistance sheet according to the related art may be welded to the plate member by the welding apparatus. To weld the inclined conductive resistance sheet according to this embodiment, the center upper jig 532 is divided into left and right parts, and the outer upper jig 531 moves upward relative to the inner upper jig 533 to perform the welding. Alternatively, the lower jig 520 and the case 510 may have different positions and designs.

Figure 29:
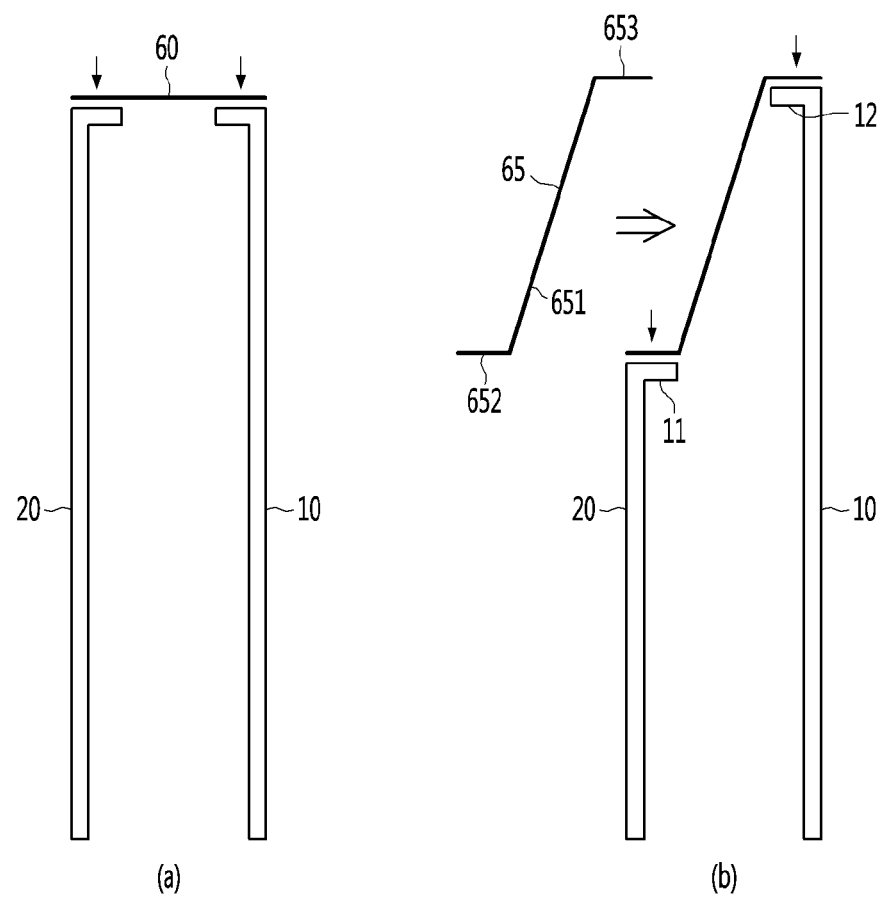
FIG. 29 is a view for comparing coupling processes of the conductive resistance sheet according to the foregoing embodiment and the conductive resistance sheet according to this embodiment.

FIG. 29 is a view for comparing coupling processes of the conductive resistance sheet according to the foregoing embodiment and the conductive resistance sheet according to this embodiment.

The conductive resistance sheet 60 of FIG. 29(*a*) according to the related art is disposed in a horizontal state so that the welding apparatus shown in FIG. 28 is applied as it is to perform the welding.

The bending-type conductive resistance sheet 65 according to this embodiment shown in FIG. 29(*b*) is provided with a first bending part 652 and a second bending part 653, which are respectively provided at both end portions of the inclined part 651 provided at the center thereof. The first welding part 652 is aligned with a first support 11 provided at the end portion of the first plate member 10, and the second welding part 653 is provided at the end portion of the second plate member 20.

The plate member and the bending-type conductive resistance sheet may be welded to each other by being inserted into the welding apparatus in the alignment state as described above.

According to this method, it is possible to secure the sealability of the coupling between the conductive resistance sheet and the plate member, and it is possible to expect an advantage of solving the limitation of leakage due to the coupling between the conductive member and the plate member.

Referring again to FIG. 25, the gasket 80 is provided with a gasket coupling member 83, and the gasket coupling member 83 is inserted into the door liner coupling groove 410 to couple the gasket. The extension direction of the main body of the gasket 80 and the extension direction of the gasket coupling tool 83 are inclined at an angle α. This is for facilitating the manufacture of the door liner.

This will be described with reference to the comparison drawing of FIG. 3.

Figure 30:
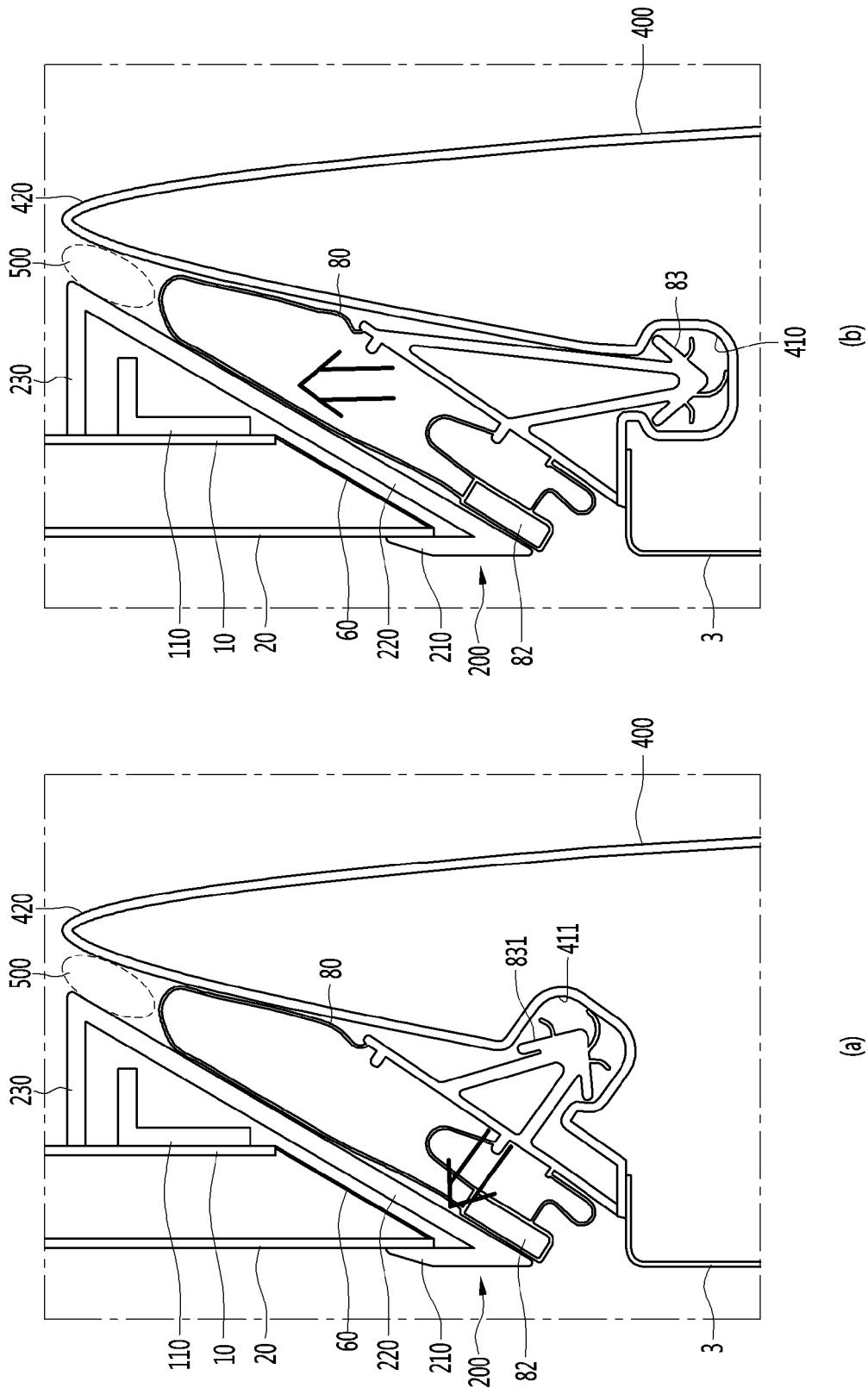
FIG. 30 is a comparison view of a gasket.

FIG. 30(*a*) illustrates a state in which the gasket body and the gasket coupling tool are perpendicular to each other as a comparative example, and FIG. 30(*b*) illustrates a state in which the gasket body and the gasket coupling tool are inclined at an angle α according to an embodiment. The comparative example of FIG. 30(*a*) is widely used as a general gasket construction.

Referring to FIG. 30(*a*), to insert the vertical gasket coupling tool 83, the door liner is provided with a recessed door liner coupling groove 411 which is provided deep and large. The recessed door liner coupling groove 411 is provided at a predetermined depth and width and in a predetermined direction for securing the coupling force of the gasket 80.

When the recessed door liner coupling groove 411 is provided deeply and inclinedly as illustrated in the drawing, molding of the door liner is very difficult.

In detail, the door liner 400 is provided through injection or vacuum molding. Here, the mold is used in which the mold is separated in one direction, and the mold may be taken out in the one direction or in one direction perpendicular to the one direction. However, the taking out of the mold may be impossible or very difficult in the direction of inclination, which is not parallel or perpendicular to the one direction.

It is impossible to take out the mold in a direction that is inclined obliquely with respect to the door liner 400 as illustrated by the arrow in FIG. 30(*a*). The mold may easily be taken out in a direction perpendicular to the door liner 400 as shown by the arrow in FIG. 30(*b*).

To reflect the difficulty of such a manufacturing process, the gasket coupling tool 83 is provided at an oblique angle, not be perpendicular to the extension direction of the may body of the gasket 80, but inclined at an angle α, and also, the door liner coupling grove 410 is provided to be inclined at an angle α. Here, the angle α is inclined at an angle other than 90 degrees. The gasket coupling tool 83 and the door liner coupling hole 410 are provided so that the conductive resistance sheet 60 is inclined at an angle.

According to the foregoing embodiment, the length of the conductive resistance sheet may be longer than that of the interval between the plate members 10 and 20. The length of the conductive resistance sheet may vary depending on the angle at which the conductive resistance sheet is inclined. Thus, the adiabatic performance may be improved by lowering the conduction heat conducted along the conductive resistance sheet. Also, since the gasket is installed at a longer and wide interval, the adiabatic performance may be further improved, and energy nose may be provided to obtain further improved adiabatic performance.

Particularly, since the energy nose is provided, it is possible to greatly improve the substantial adiabatic performance using a narrow space, and it is possible to improve the adiabatic performance that is not obtained in the case of the refrigerator using the vacuum adiabatic body according to the related art.

The vacuum adiabatic body using the inclined conductive resistance sheet according to another embodiment is proposed. In the following other embodiments, the inclination of the conductive resistance sheet is different in the angular direction, and the other portions are the same as the embodiment shown in FIG. 25 and the like. Thus, the description that may be applied will be applied equally to the following embodiments.

Figure 31:
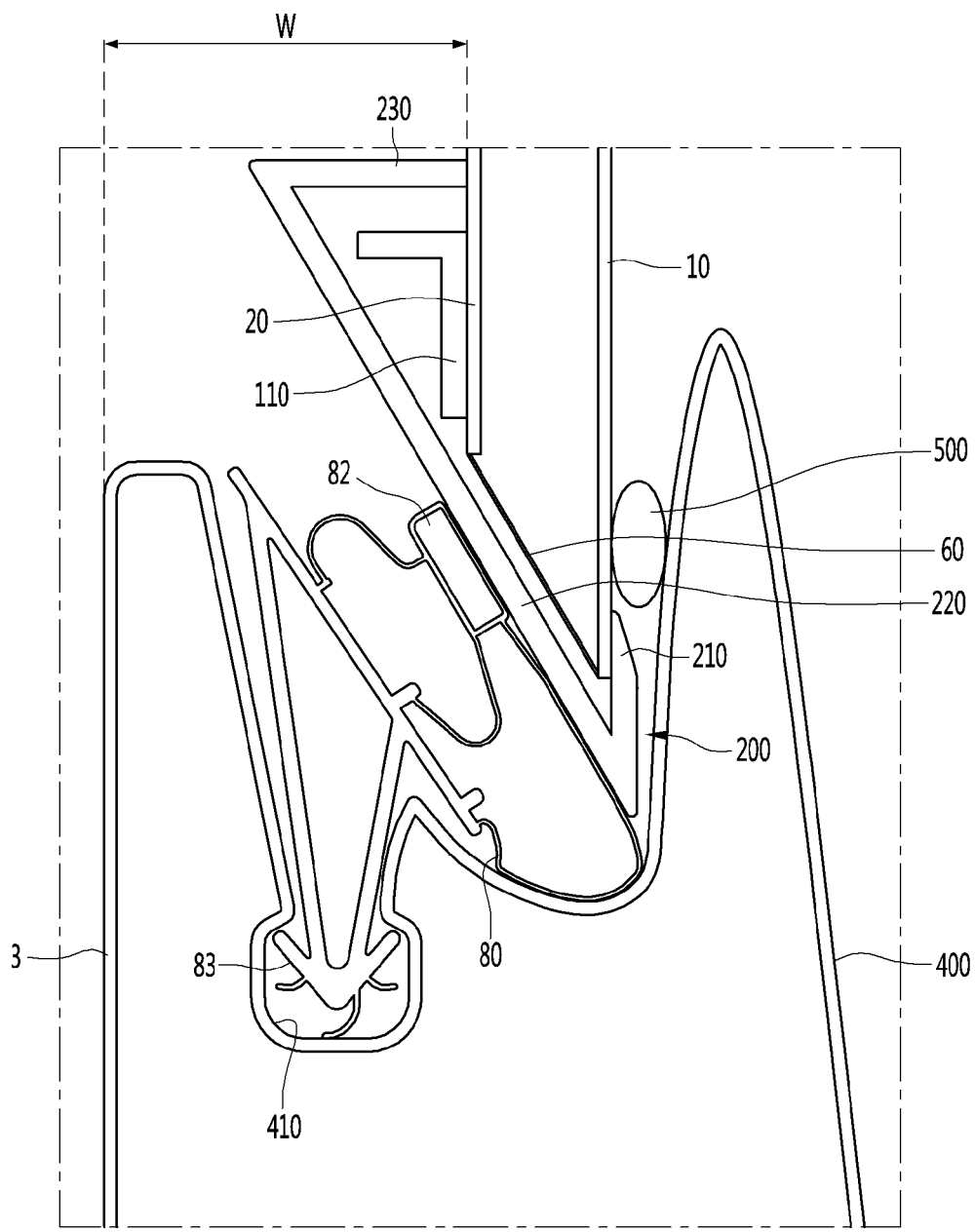
FIG. 31 is an enlarged cross-sectional view illustrating a contact part between a door and a main body of the refrigerator as an edge portion of a vacuum adiabatic body according to another embodiment.

FIG. 31 is an enlarged cross-sectional view illustrating a contact part between a door and a main body of the refrigerator as an edge portion of a vacuum adiabatic body according to another embodiment.

Referring to FIG. 31, a first plate member 10, a second plate member 20, and a conductive resistance sheet 60 are provided. The conductive resistance sheet 60 may be provided as a thin plate to resist to thermal conduction between the plate members 10 and 20. Although the conductive resistance sheet 60 is provided as a flat plan shape as a thin plate, the conductive resistance sheet 60 may have a curved shape by being pulled inward when vacuum is applied to the vacuum space part 50.

The conductive resistance sheet 60 is provided to be inclined. In detail, the conductive resistance sheet 60 is provided to be inclined obliquely at a predetermined angle but to be perpendicular to the extension direction of the plate members 10 and 20. Unlike the embodiment shown in FIG. 25, it may be provided to be inclined outward from the inside of the vacuum adiabatic body to an acute angle outwardly.

The sealing frame 200, the gasket 80, the energy nose 500, and the like are provided as in the embodiment of FIG. 25. However, an edge portion of the door 3 is wider outward than an edge portion of the main body 2 by w. Due to this difference in structure, there is a difference in the structure and action as follows.

Particularly, the gasket 80 is provided to be inclined to the outside of the refrigerator like the vacuum adiabatic body. The sealing frame 200 is provided to the outside of the refrigerator, i.e., to be inclined outward from the inside of the vacuum adiabatic body. The sealing frame 200 provides a first plate member 10 for providing a vacuum space and a cover member for an adiabatic space covering an end portion of the second plate member 20. At least a portion of the side surface part 220 of the sealing frame 200 has a first extension part on which the gasket 80 is seated when the door is closed.

The energy nose 500 may be provided in a gap part between the first plate member 10 and the door 3, more particularly, the door liner 400.

According to this embodiment, it is not necessary to provide the long sealing frame so as to obtain the energy nose, and the first plate member may be used as one surface of the energy nose. Also, the refrigerator according to this embodiment may be applied to the refrigerator in which the main body is inserted into the refrigerator installation space, and only the door protrudes.

INDUSTRIAL APPLICABILITY

The vacuum adiabatic body and the refrigerator according to the embodiments may solve the above limitations according to the related art, which does not provide the energy nose, and the conductive resistance sheet may increase in length to reduce the conductive heat transfer amount and improve the adiabatic effect due to the contact between the members, thereby further approaching the practical industrial application of the device using the vacuum adiabatic body.

What is claimed is:

1. A refrigerator comprising:
a main body having a vacuum adiabatic body to form a storage space, wherein the vacuum adiabatic body includes:
a first plate; and
a second plate, at least a portion of the second plate being spaced apart from the first plate in a first direction to define a vacuum space between the first plate and the second plate;
a door provided to open and close an opening of the main body to allow access to the storage space;
a gasket installed on one of the door or the main body; and
a frame provided between the vacuum space and a portion of the door, the frame including a wall that contacts the gasket when the door closes the opening and that separates from the gasket when the door opens the opening,
wherein the wall of the frame has a surface that is inclined with respect to an extension direction of at least one of the first plate or the second plate.

2. The refrigerator according to claim 1, further comprising a heat resistance sheet that is coupled to at least one of the first plate or the second plate, wherein the frame is provided to cover the heat resistance sheet.

3. The refrigerator according to claim 1, wherein the wall of the frame includes:
a first region on which the gasket is seated when the door is closed; and
a second region configured to provide an air gap between the frame and the door when the door is closed.

4. The refrigerator according to claim 3, wherein at least a portion of the second region is inclined with respect to the extension direction of at least one of the first plate or the second plate.

5. The refrigerator according to claim 1, wherein a distance between the first plate and the second plate in the first direction is less than a width of the gasket in the first direction.

6. The refrigerator according to claim 1, wherein a distance between the first plate and the second plate in the first direction is less than a width of the frame in the first direction.

7. The refrigerator according to claim 2, wherein the heat resistance sheet has a surface inclined with respect to the extension direction of at least one of the first plate or the second plate.

8. The refrigerator according to claim 7, wherein the heat resistance sheet includes:
a first welding surface extending from a first end of the surface of the heat resistance sheet, the first welding surface being welded to the first plate; and
a second welding surface extending from a second end of the surface of the heat resistance sheet, the second welding surface being welded to the second plate.

9. The refrigerator according to claim 8,
wherein each of the first plate and the second plate includes an end adjacent to the frame, and
wherein one of the end of the first plate or the end of the second plate further protrudes with respect to another one of the end of the first plate or the end of the second plate.

10. The refrigerator according to claim 1, wherein the frame includes:
an inner surface wall positioned to correspond to a portion of the first plate; and
an outer surface wall positioned to correspond to a portion the second plate;
wherein the wall that is inclined is provided between the inner surface wall and the outer surface wall.

11. The refrigerator according to claim 10, wherein at least a portion of the inner surface wall extends in a different direction than the outer surface wall.

12. The refrigerator according to claim 10, wherein at a portion of the inner surface wall extends in a different direction from the extension direction of the first plate.

13. The refrigerator according to claim 10, wherein at least a portion of the outer surface wall has an extension direction that corresponds to the extension direction of the second plate.

14. A refrigerator comprising:
a main body having a vacuum adiabatic body to form a storage space, wherein the vacuum adiabatic body includes:
a first plate; and
a second plate, at least a portion of the second plate being spaced apart from the first plate in a first direction to define a vacuum space between the first plate and the second plate;
a door provided to open and close an opening of the main body to allow access to the storage space;
a gasket installed on one of the door or the main body; and
a frame provided between the vacuum space and a portion of the door, the frame including a wall that contacts the gasket when the door closes the opening and that separates from the gasket when the door opens the opening,
wherein the gasket includes:
a gasket body contacting the frame to seal between the door and the main body when the door is closed, at least a portion of the gasket body being inclined with respect to an extension direction of at least one of the first plate or the second plate.

15. The refrigerator according to claim 14, wherein the gasket includes a gasket coupling end that is provided to be obliquely inclined with respect to an extension direction of the gasket body.

16. The vacuum adiabatic body according to claim 14, wherein each of the first plate and the second plate includes an end adjacent to the frame, and
wherein the wall extends substantially parallel to a line between the end of the first plate and the end of the second plate.

17. A vacuum adiabatic body comprising:
a main body having a vacuum adiabatic body to form a storage space configured to store items, wherein the vacuum adiabatic body includes:
a first plate; and
a second plate, at least a portion of the second plate being spaced apart from the first plate in a first direction to define a vacuum space between the first plate and the second plate;
a gasket installed on one of the door or the main body; and
a frame provided between the vacuum space and a portion of the door, the frame including a wall that contacts the gasket when the door closes the opening,
wherein the wall is spaced apart from and does not contact the first and second plates.

18. The refrigerator according to claim 17, wherein the wall of the frame is obliquely inclined toward the storage space inside the main body with respect to an extension direction of at least one of the first plate or the second plate.

19. The refrigerator according to claim 17, wherein the gasket includes:
a gasket body contacting the frame to seal between the door and the main body when the door is closed; and
a gasket coupling end provided to be obliquely inclined with respect to an extension direction of the gasket body.

20. The refrigerator according to claim 17, wherein the wall includes a first region on which the gasket is seated when the door is closed and a second region configured to provide an air gap between the door and the frame when the door is closed.

* * * * *